(12) United States Patent
Williams

(10) Patent No.: US 8,609,772 B2
(45) Date of Patent: Dec. 17, 2013

(54) ELASTIC FILMS HAVING IMPROVED MECHANICAL AND ELASTIC PROPERTIES AND METHODS FOR MAKING THE SAME

(75) Inventor: Michael Glenn Williams, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 182 days.

(21) Appl. No.: 13/077,025

(22) Filed: Mar. 31, 2011

(65) Prior Publication Data

US 2011/0184127 A1    Jul. 28, 2011

Related U.S. Application Data

(63) Continuation-in-part of application No. 11/877,365, filed on Oct. 23, 2007.

(51) Int. Cl.
*C08F 110/06* (2006.01)
*C08F 210/06* (2006.01)

(52) U.S. Cl.
USPC ........... 525/191; 525/216; 525/219; 525/232; 525/240

(58) Field of Classification Search
USPC .................. 525/98, 191, 216, 219, 232, 240
See application file for complete search history.

(56) References Cited

U.S. PATENT DOCUMENTS

| | | | |
|---|---|---|---|
| 3,862,068 A | 1/1975 | Russell | |
| 4,540,753 A | 9/1985 | Cozewith et al. | |
| 4,554,304 A | 11/1985 | Hansen et al. | |
| 4,916,180 A | 4/1990 | Robinson et al. | |
| 5,108,820 A | 4/1992 | Kaneko et al. | |
| 5,162,445 A | 11/1992 | Powers et al. | |
| 5,336,552 A | 8/1994 | Strack et al. | |
| 5,382,400 A | 1/1995 | Pike et al. | |
| 5,667,902 A | 9/1997 | Brew et al. | |
| 6,255,395 B1 * | 7/2001 | Klosiewicz | 525/191 |
| 6,342,565 B1 | 1/2002 | Cheng et al. | |
| 6,525,157 B2 | 2/2003 | Cozewith et al. | |
| 6,559,262 B1 | 5/2003 | Waymouth et al. | |
| 6,770,713 B2 | 8/2004 | Hanke et al. | |
| 6,881,800 B2 | 4/2005 | Friedersdorf | |
| 6,984,696 B2 | 1/2006 | Curry et al. | |
| 7,244,787 B2 | 7/2007 | Curry et al. | |
| 2004/0192823 A1 | 9/2004 | Curry et al. | |
| 2004/0236042 A1 | 11/2004 | Datta et al. | |
| 2004/0249046 A1 | 12/2004 | Abhari et al. | |
| 2005/0215964 A1 | 9/2005 | Autran et al. | |
| 2009/0105418 A1 | 4/2009 | Dharmarajan et al. | |

FOREIGN PATENT DOCUMENTS

| | | |
|---|---|---|
| EP | 1 017 729 | 7/2000 |
| EP | 1 070 087 | 1/2001 |
| EP | 1 233 191 | 8/2002 |
| EP | 1 614 699 | 1/2006 |
| WO | 02/36651 | 5/2002 |
| WO | 03/040095 | 5/2003 |
| WO | 03/040201 | 5/2003 |
| WO | 03/040202 | 5/2003 |
| WO | 03/040233 | 5/2003 |
| WO | 03/040442 | 5/2003 |
| WO | 2005/049672 | 6/2005 |

OTHER PUBLICATIONS

Ouano et al., "*Gel Permeation Chromatography*", Polymer Molecular Weights: Part II, 1975, pp. 288-368.
Rodriguez, "*The Molecular Weight of Polymers*", Principles of Polymer Systems, 3rd Edition, 1989, pp. 155-160.
Vector Styrenic Block Copolymers, Data Sheet: "*Vector 4211, Styrene-Isoprene-Styrene (SIS) Block Copolymer*", Dexco Polymers LP, downloaded from www.dexcopolymers.com, Apr. 12, 2011.
Ver Strate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.
Wheeler et al., "*Gel Permeation Chromatography/Fourier Transform Infrared Interface for Polymer Analysis*", Applied Spectroscopy, 1993, vol. 47, No. 8, pp. 1126-1130.

\* cited by examiner

*Primary Examiner* — Jeffrey Mullis

(57) ABSTRACT

A film comprising one or more propylene-based polymers, one or more hydrocarbon resins, and one or more polyolefin additives provides enhanced mechanical and elastic properties compared to the neat propylene-based polymer. The propylene-based polymer may have (i) 60 wt % or more units derived from propylene; and (ii) crystallinity of from 0.25% to 40%, resulting from isotactically arranged propylene-derived sequences. The hydrocarbon resin may have a glass transition temperature greater than 20° C. The polyolefin additive may have a crystallinity greater than the crystallinity of the propylene-based polymer. Methods for making and using the films are also described.

18 Claims, 8 Drawing Sheets

ELASTIC FILMS HAVING IMPROVED MECHANICAL AND ELASTIC PROPERTIES AND METHODS FOR MAKING THE SAME

CROSS-REFERENCE TO RELATED APPLICATIONS

This application is a continuation-in-part of U.S. patent application Ser. No. 11/877,365, filed 23 Oct. 2007, and entitled "Elastic Film Compositions with Improved Tear Resistance," which is now published as U.S. Patent Publication Number 2009/0105418.

BACKGROUND

1. Field

Embodiments of the present invention generally relate to propylene-based polymers and films made therefrom. More particularly, embodiments of the present invention relate to films of propylene-based polymers having two or more additives blended therewith to improve mechanical and elastic properties.

2. Description of the Related Art

Materials with good stretchability and elasticity are used to manufacture a variety of disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer. Various types of elastic laminates have been used for such materials.

Elastic laminates, especially those used as diaper waist bands, leg cuffs, and elastic stretch engines, are intended to contact the wearer or user. As such, comfort is a primary design consideration. The comfort factor is a direct result of the stretchability and elasticity of the film; however, the stretchability and elasticity of the film usually comes with a price. As the stretchability and elasticity of the film increase, the films become less durable and more susceptible to tear. U.S. Patent Publication No. 2009/0105418 discloses hydrocarbon resins that can be added to the elastic material to increase tear resistance of a film without significantly compromising elastic properties. While enhanced tear strength is an important mechanical property of elastic films, it is only one of the mechanical properties important to the overall performance of elastic materials.

Accordingly, technology is available to increase the elasticity of a base elastic material while sacrificing mechanical properties. Additionally, technology is available to increase the mechanical properties of the base elastic material while sacrificing elastic properties. Still further, technology is available to increase the tear strength of an elastic material without compromising elastic properties. However, there is a continuing need for increasing more than one mechanical property without compromising the remaining physical and elastic properties.

SUMMARY OF THE INVENTION

Films and methods for making the same are provided. In at least one specific embodiment, the film can include a propylene-based polymer, a hydrocarbon resin, and a polyolefin additive. The films may comprise at least 80 wt % of the propylene-based polymer, between 0.1 wt % and 20 wt % of the hydrocarbon resin, and between 0.1 wt % and 20 wt % of the polyolefin additive. By reference to a propylene-based polymer, a hydrocarbon resin, and a polyolefin additive, it is to be understood that each reference may include one or more of said compositions. The propylene-based polymer can include 60 wt % or more units derived from propylene. Additionally, the propylene-based polymer may have a crystallinity of from 0.25% to 40% resulting from isotactically arranged propylene-derived sequences. In some implementations, the propylene-based polymer may have a heat of fusion less than 65 J/g. The hydrocarbon resin can have a glass transition temperature greater than 20° C. The polyolefin additive may be any suitable polyolefin having crystallinity greater than the crystallinity of the propylene-based polymer.

The propylene-based polymer, the hydrocarbon resin, and the polyolefin additive may be selected and/or added in suitable proportions to provide a resulting film that has a tension set that is less than 5% higher than the tension set of a film formed from the propylene-based polymer alone. Additionally, the propylene-based polymer, the hydrocarbon resin, and the polyolefin additive may be selected and/or added in suitable proportions to provide a resulting film that has a tensile strength and a tear strength greater than or equal to the same properties of a film formed from the propylene-based polymer alone. In some implementations, the weight percent of the hydrocarbon resin and the weight percent of the polyolefin additive is controlled to increase both the film tensile strength and the film tear strength. Additionally or alternatively, in some implementations, the weight percent of the hydrocarbon resin and the weight percent of the polyolefin additive is controlled to increase at least one of the film tensile strength and the film tear strength by at least 10%, or more preferably by at least 20%. Still additionally or alternatively, in some implementations, the film tear strength is improved by at least 50%.

In some implementations, the propylene-based polymer has an ethylene content of from 5 wt % to 16 wt %. Additionally or alternatively, the propylene-based polymers may have a melt flow rate (230° C./2.16 Kg) of from 1 g/10 min to 400 g/10 min, or more preferably a melt flow rate (230° C./2.16 Kg) of at least 20 g/10 min. The propylene-based polymer may have a density of at least 0.80 g/cm$^3$. Additionally or alternatively, the propylene-based polymer has a melt temperature of less than 110° C.

In some implementations, the hydrocarbon resin may be a hydrogenated cycloaliphatic resin. The hydrocarbon resin may have a molecular weight (Mn) of from 200 to 5000. Additionally or alternatively, the hydrocarbon resin may have a softening point of from 80° C. to 180° C.

In some implementations, the polyolefin additive comprises at least one of a propylene-based polymer and an ethylene-based polymer. For example, the polyolefin additive may comprise a metallocene-catalyzed ethylene-based polymer. Additionally or alternatively, the polyolefin additive may comprise a second propylene-based polymer distinct from the propylene-based polymer comprising the majority of the film. The polyolefin additive component has a higher crystallinity than the propylene-based polymer component In some implementations, the polyolefin additive may comprise polypropylene or an LLDPE.

In some implementations, the film may further have a hysteresis that is less than 5% higher than the hysteresis of the film formed from the propylene-based polymer alone. In such implementations, the selection and weight percent of the polyolefin additive and the hydrocarbon resin may be determined based at least in part on one or more of the film tension set, the film hysteresis, the film tensile strength, and the film tear strength.

The films described herein may be cast films or blown films formed through any conventional film forming processes. In each such film forming process, the methods of forming the film may comprise selecting or forming compositions for one or more layers of the film. Suitable methods of making such compositions according to the present invention may include admixing a propylene-based polymer, a miscible hydrocarbon resin, and a polyolefin additive. The propylene-based polymer comprises at least about 80 wt % of the film; the hydrocarbon resin comprises between 0.1 wt % and 20 wt % of the film; and the polyolefin additive comprises between 0.1 wt % and 20 wt % of the film. The propylene-based polymer, miscible hydrocarbon resin, and polyolefin additive may each be added in an amount sufficient to provide through a standard process a film having a film tension set that is less than 5% higher than a first tension set for a base film prepared through the standard process and without either the hydrocarbon resin or the polyolefin additive. Additionally, at least one of a film tensile strength and a film tear strength is increased compared to a first tensile strength and a first tear strength, respectively, of the base film. The propylene-based polymer may have 60 wt % or more units derived from propylene and may have a crystallinity of from 0.25% to 40% resulting from isotactically arranged propylene-derived sequences. The hydrocarbon resin may have a glass transition temperature greater than 20° C. The polyolefin additive may have a crystallinity percentage greater than the crystallinity percentage of the propylene-based polymer.

BRIEF DESCRIPTION OF THE FIGURES

The foregoing and other advantages of the present technique may become apparent upon reading the following detailed description and upon reference to the drawings in which.

DETAILED DESCRIPTION OF THE INVENTION

Figure 1:
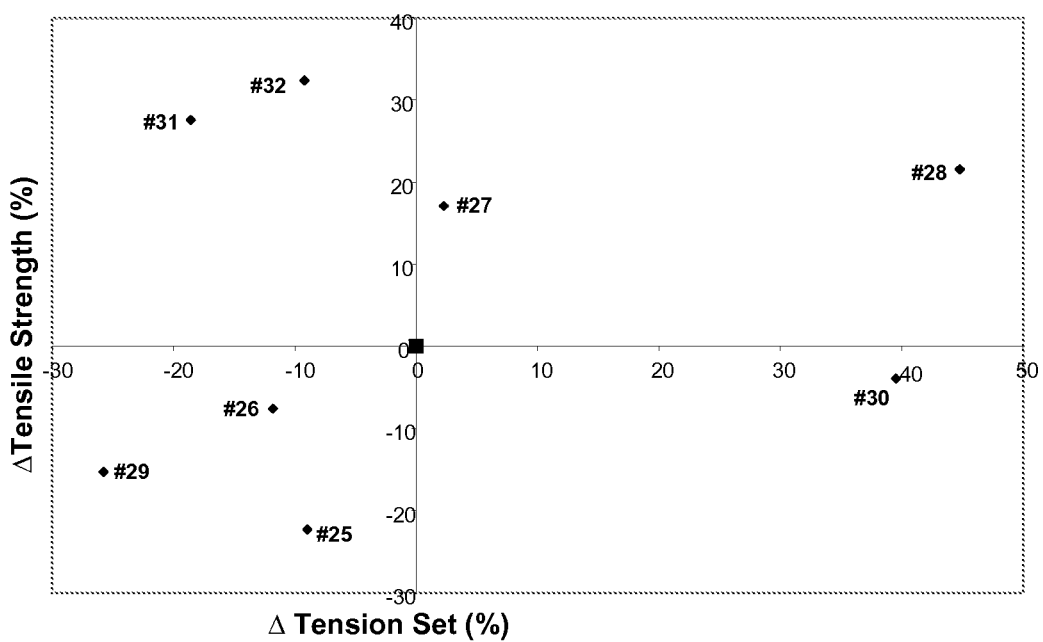
FIG. 1 illustrates the tensile strength and tension set of various samples relative to a reference sample.

Reference will now be made to exemplary implementations and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular implementations of the present invention are disclosed and described, it is to be understood that this invention is not limited to the particular process and materials disclosed herein as such may vary to some degree.

It is also to be understood that the terminology used herein is used for the purpose of describing particular implementations only and is not intended to be limiting, as the scope of the present invention will be defined only by the appended claims and equivalents thereof.

Films having increased tear resistance and tensile strength with excellent stretchability and elasticity and methods for producing the same are provided. In one or more embodiments, the film includes one or more propylene-based polymers, one or more hydrocarbon resins, and one or more polyolefin additives. The polyolefin additives may include polypropylene, one or more propylene- or ethylene-based polymers, and/or thermoplastic resins. In one or more embodiments, the film can include one or more rubber components and/or one or more additives. Preferably, the various components of the film are selected such that the film has a delta tear strength of at least about +5%, a delta tensile strength of at least about +5%, a delta tension set of no more than +5%, and/or a delta hysteresis of no more than +5%.

Propylene-Based Polymer

The propylene-based polymer can be propylene-α-olefin-diene terpolymers or propylene-α-olefin copolymers. For simplicity and ease of description, however, the term "propylene-based polymer" as used herein refers to both propylene-α-olefin-diene terpolymers and propylene-α-olefin copolymers.

The propylene-based polymer can be prepared by polymerizing propylene with one or more comonomers. In at least one implementation, the propylene-based polymer can be prepared by polymerizing propylene with one or more dienes. Additionally or alternatively, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO 03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP 1070087. The catalyst described in EP 1614699 may also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is butene, hexene or octene. In other embodiments, two alpha-olefins are present, preferably ethylene and one of butene, hexene or octene.

Preferably, the propylene-based polymer comprises about 0.3 wt % to about 24 wt % of a non-conjugated diene, based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.3 wt % to about 10 wt %, more preferably from about 0.3 to about 5 wt %, more preferably from about 0.3 wt % to about 4 wt %, preferably from about 0.3 wt % to about 3.5 wt %, preferably from about 0.3 wt % to about 3.0 wt %, and preferably from about 0.3 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present, the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %. Additionally or alternatively, in some implementations, the propylene-based polymer may comprise propylene and one or more α-olefins, with the α-olefins present in the ranges described above.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D, as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, or more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, or more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, or more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be from about 1.5 to about 40. In some embodiments, the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is fully incorporated herein by reference for purposes of U.S. practices) and references cited therein, in Macromolecules, 1988, volume 21, pg. 3360 (Verstrate et al.) (which is fully incorporated herein by reference for purposes of U.S. practice), and references cited therein, and in accordance with the procedures disclosed in U.S. Pat. No. 6,525,157, column 5, lines 1-44, which patent is fully incorporated herein by reference.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_l = KM_v^{\alpha}$, where K and α are measured values for linear polymers and should be obtained on the same instrument as the one used for the g' index measurement.

In one or more embodiments above or elsewhere herein, the propylene-based polymer may have a density of about 0.85 g/cm³ to about 0.92 g/cm³, more preferably, about 0.86 g/cm³ to 0.89 g/cm³, more preferably about 0.86 g/cm³ to about 0.88 g/cm³ at room temperature as measured per the ASTM D-1505 test method.

In one or more embodiments above or elsewhere herein, the propylene-based polymer may have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) is from about 0.5 g/10 min to about 200 g/10 min and more preferably from about 1 g/10 min to about 100 g/10 min. In some embodiments, the propylene-based polymer has an MFR of 0.5 g/10 min to 200 g/10 min, especially from 0.5 g/10 min to 50 g/10 min, more preferably from 1 g/10 min to 30 g/10 min, more preferably 2 g/10 min to 25 g/10 min or more especially 3 g/10 min to about 20 g/10 min.

The propylene-based polymer may have a Mooney viscosity ML (1+4)@125° C., as determined according to ASTM D-1646, of less than 100, more preferably less than 75, even more preferably less than 60, most preferably less than 30.

In one or more embodiments above or elsewhere herein, the propylene-based polymer may have a heat of fusion (Hf) determined according to the DSC procedure described below which is greater than or equal to about 0.5 Joules per gram (J/g), and is ≤about 80 J/g, preferably ≤about 75 J/g, preferably ≤about 70 J/g, more preferably ≤about 60 J/g, more preferably ≤about 50 J/g, more preferably ≤about 45 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf) which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer can also be expressed in terms of percentage of crystallinity (i.e., % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to a baseline as described herein) being considered the melting point of the propylene-based polymer.

The propylene-based polymer preferably has a melting point (measured by DSC) of equal to or less than 120° C., preferably less than 110° C., preferably less than 105° C., more preferably less than or equal to 90° C., preferably from about 25° C. to about 80° C., preferably about 25° C. to about 75° C., more preferably about 30° C. to about 65° C.

The Differential Scanning Calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, a disc of about 15-20 mg is removed from the pressed pad using a punch die and is placed in a 10 microliter aluminum sample pan. The sample is placed in a Differential Scanning Calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}$C NMR, of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 2004/0236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964, all of which are fully incorporated herein by reference. The propylene-based polymer can also include one or more polymers consistent with those described in EP 1 614 699 or EP 1 017 729.

Grafted (Functionalized) Backbone

In one or more embodiments, the propylene-based polymer can be grafted (i.e., "functionalized"). As used herein, the term "grafting" denotes covalent bonding of the grafting monomer to a polymer chain of the propylene-based polymer. The grafting monomer can be one or more ethylenically unsaturated carboxylic acids or acid derivatives, such as an acid anhydride, ester, salt, amide, imide, acrylates or the like.

Illustrative grafting monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophtalic anhydride, norbornene-2,3-dicarboxylic acid anhydride, nadic anhydride, methyl nadic anhydride, himic anhydride, methyl himic anhydride, and x-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer includes about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt %, preferably at least about 0.5 wt % and highly preferably about 1.5 wt %.

Styrene and derivatives thereof such as paramethyl styrene, or other higher alkyl substituted styrenes such as t-butyl styrene can be used as a charge transfer agent in the presence of the grafting monomer to inhibit chain scission. This allows further minimization of the beta scission reaction and the production of a higher molecular weight grafted polymer (MFR equal to about 1.5).

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw or twin screw extruder reactors, such as co-rotating intermeshing extruders or counter-rotating non-intermeshing extruders, and co-kneaders are also preferred.

In one or more embodiments, the grafted polymer can be prepared by melt blending the ungrafted propylene-based polymer with a free radical generating catalyst, such as a peroxide initiator, in the presence of the grafting monomer. The preferred sequence for the grafting reaction includes melting the propylene-based polymer, adding and dispersing the grafting monomer, introducing the peroxide and venting the unreacted monomer and by-products resulting from the peroxide decomposition. Other sequences can include feeding the monomers and the peroxide pre-dissolved in a solvent.

Illustrative peroxide initiators include but are not limited to: diacyl peroxides such as benzoyl peroxide; peroxyesters such as tert-butyl peroxy benzoate, tert-butylperoxy acetate, 00-tert-butyl-0-(2-ethylhexyl)monoperoxy carbonate; peroxyketals such as n-butyl-4,4-di-(tert-butyl peroxy) valerate; and dialkyl peroxides such as 1,1-bis(tertbutylperoxy) cyclohexane, 1,1-bis(tert-butylperoxy)-3,3,5-trimethylcyclohexane, 2,2-bis(tert-butylperoxy)butane, dicumyl-peroxide, tert-butylcumylperoxide, di-(2-tert-butylperoxy-isopropyl-(2)) benzene, di-tert-butylperoxide (DTBP), 2,5-dimethyl-2,5-di (tert-butylperoxy)-hexane, 2,5-dimethyl-2,5-di(tert-butylperoxy)-hexyne, 3,3,5,7,7-pentamethyl 1,2,4-trioxepane; and the like.

Hydrocarbon Resin

The one or more hydrocarbon resins may be grafted or ungrafted. Optionally, the resin may be hydrogenated. Preferably, the one or more hydrocarbon resins are low molecular weight hydrocarbon(s) that are compatible with the remaining components of the film. The resin may have a number average molecular weight (Mn) less than about 5000, preferably less than about 2000, most preferably in the range of from about 500 to about 1000. The resin may be natural or synthetic and, in some embodiments, may have a softening point in the range of from about 60° C. to about 180° C.

Suitable hydrocarbon resins can include, but are not limited to, petroleum resins, terpene resins, styrene resins, and cyclopentadiene resins. In one or more embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Suitable hydrocarbon resins include EMPR 120, 104, 111, 106, 112, and 115, EMPR 100 and 100A, ECR-373 and ESCOREZ® 2101, 2203, 2520, 5380, 5600, 5618, and 5690 (commercially available from ExxonMobil Chemical Company of Baytown, Tex., USA); ARKON™ M90, M100, M115 and M135 and SUPER ESTER™ rosin esters (commercially available from Arakawa Chemical Company of Japan); SYLVARES™ phenol modified styrene, methyl styrene resins, and styrenated terpene resins, ZONATAC™ terpene-aromatic resins, and terpene phenolic resins (commercially available from Arizona Chemical Company of Jacksonville, Fla., USA); SYLVATAC™ and SYLVALITE™ rosin esters (commercially available from Arizona Chemical Company of Jacksonville, Fla., USA); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa., USA); FORAL™ PENTALYN™, and PERMALYN™ rosins and rosin esters (commercially available from Hercules, now Eastman Chemical Company of Kingsport, Tenn., USA); QUINTONE™ acid modified $C_5$ resins, $C_5/C_9$ resins, and acid modified $C_5/C_9$ resins (commercially available from Nippon Zeon of Japan); LX™ mixed aromatic/cycloaliphatic resins (commercially available from Neville Chemical Company of Pittsburgh, Pa., USA); CLEARON™ hydrogenated terpene aromatic resins (commercially available from Yasuhara of Japan); and PICCOLYTE™ (commercially available from Loos & Dilworth, Inc. of Bristol, Pa., USA). Other suitable hydrocarbon resins may be found in U.S. Pat. No. 5,667,902.

Preferred hydrocarbon resins include saturated alicyclic resins. Such resins, if used, may have a softening point in the range of from about 85° C. to about 140° C., or preferably in the range of about 100° C. to about 140° C., as measured by the ring and ball technique. Examples of suitable, commercially available saturated alicyclic resins are ARKON-P® resins (commercially available from Arakawa Forest Chemical Industries, Ltd., of Japan).

The amount of the one or more hydrocarbon resins, either alone or in combination, in the film is preferably less than about 20 wt %, and more preferably in the range of from about 0.1 wt % to about 15 wt %, based on the total weight of the film. In some implementations, the hydrocarbon resins may comprise between 5 wt % and 15 wt %, based on the total weight of the film.

Polyolefin Additive

The term "polyolefin additive" as used herein broadly refers to any polymer that is considered a polyolefin by persons skilled in the art. Accordingly, the term polyolefin additive includes polypropylene, polyethylene, propylene-based polymers, ethylene-based polymers, and other polymers. As can be well understood, this encompasses a large number of polymers. To further clarify the meaning of polyolefin additive as used herein, it should be noted that the polyolefin is referred to as an additive for at least two reasons: 1) it is distinguishable from the propylene-based polymer that comprises the majority of the film; and 2) it is present in some quantity greater than zero. As an additive, it must be present and in addition to the majority component of the film. Accordingly, reference to the polyolefin additive in quantities less than 20 wt % does not include the quantity 0 wt %. Similarly, it should be noted that the polyolefin additive may be distinguishable from the propylene-based polymer in many ways, but will be distinguishable at least by having a higher crystallinity. Accordingly, the range of available polyolefin additives will be narrowed upon selection of the propylene-based polymer comprising the majority of the film. One of ordinary skill in the art will recognize several other properties that will affect the selection of a suitable polyolefin additive once the majority component, the propylene-based polymer, is selected. For example, the polyolefin additive may be selected to facilitate blending with the propylene-based polymer.

As indicated above, an exemplary polyolefin additive is polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the present films has a melting point above 110° C., includes at least 90 wt % propylene units, and contains isotactic sequences of those units. The polypropylene can also include atactic sequences or syndiotactic sequences, or both. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. The polypropylene can have a high MFR (e.g., from a low of 10, or 15, or 20 g/10 min to a high of 25 to 30 g/10 min). The polypropylene can also have a lower MFR, e.g., "fractional" polypropylenes which have an MFR less than 1.0. Those with high MFR are preferred for ease of processing or compounding.

In one or more embodiments, the polypropylene is or includes isotactic polypropylene. Preferably, the polypropylene contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polypropylenes and methods for making the same are described in U.S. Pat. No. 6,342,565.

The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Polypropylene is just one exemplary polyolefin additive. Some implementations may incorporate polyolefin additive comprising a propylene-based polymer, such as described above, but having a higher crystallinity. As can be understood from the previous section on propylene-based polymers, that term encompasses a range of materials having different properties. In some implementations of the present disclosure, the polyolefin additive may be provided by a blend of two propylene-based polymers having different cystallinities, wherein the lower crystallinity propylene-based polymer comprises at least 80 wt % of the film and the higher crystallinity propylene-based polymer comprises less than 20 wt % of the film. In the interest of brevity, the foregoing description of propylene-based polymers is referenced here rather than repeated here, with the understanding that all such propylene-based polymers are available as polyolefin additives, provided that the crystallinity is greater than that of the majority component.

Additionally or alternatively, the polyolefin additive may be provided by a thermoplastic resin. The thermoplastic resin is or includes an olefinic thermoplastic resin. The "olefinic thermoplastic resin" can be any material that is not a "rubber" and that is a polymer or polymer blend considered by persons skilled in the art as being thermoplastic in nature, e.g., a polymer that softens when exposed to heat and returns to its original condition when cooled to room temperature. The olefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof with (meth)acrylates and/or vinyl acetates. Preferably, the olefinic thermoplastic resin is unvulcanized or non cross-linked.

The polyolefin additive may include one or more ethylene polymers or ethylene-based polymers, such as plastomers. Exemplary ethylene polymers may include ethylene homopolymers and ethylene copolymers incorporating one or more comonomers. Exemplary ethylene polymer polyolefin additives include low-density polyethylene ("LDPE"), linear low-density polyethylene ("LLDPE"), and high-density polyethylene ("HDPE"). Generally, LDPE has a density of about 0.900 to about 0.925 g/cm$^3$, linear low-density polyethylene (LLDPE) has a density of about 0.910 to about 0.940 g/cm$^3$, and high-density polyethylene (HDPE) with a density of about 0.940 to about 0.960 g/cm$^3$. Various types of polyethylenes are known in the art. Similarly, various processes for preparing such polyethylenes are known, such as gas phase processes, slurry processes, solution processes, and the like.

Low-density polyethylene ("LDPE") can be prepared at high pressure using free radical initiators. LDPE is also known as "branched" or "heterogeneously branched" polyethylene because of the relatively large number of long chain branches extending from the main polymer backbone. The LDPE may have a MWD of about 1.5 to about 10, a melt index greater than about 0.25, and includes at least 99 wt % of ethylene monomer units.

LLDPE's are copolymers of ethylene and alpha-olefins. Such alpha-olefins will generally have 3 to 20 carbon atoms. Polymers of ethylene and one or more or these alpha-olefins are contemplated. In certain embodiments, the alpha-olefins are selected from butene-1, pentene-1,4-methyl-1-pentene, hexene-1, octene-1, decene-1, and combinations thereof. In other embodiments, the alpha-olefins are selected from butene-1, hexene-1, octene-1, and combinations thereof. The LLDPE's may be produced from any suitable catalyst system including conventional Ziegler-Natta type catalyst systems and, preferably, metallocene based catalyst systems. Exemplary metallocene catalyzed linear low density polyethylenes described herein are commercially available from ExxonMobil Chemical Company under the designation Exceed® or Enable®.

The polymers referenced herein as HDPE include polymers made using a variety of catalyst systems, including Ziegler-Natta, Phillips-type catalysts, chromium based catalysts, and metallocene catalyst systems, which may be used with alumoxane and/or ionic activators. HDPE is a semi-crystalline polymer available in a wide range of molecular weights, as indicated by either MI or HLMI (melt index or high-load melt index), and includes an ethylene content of at least 99 mole percent based upon the total moles of the HDPE. If incorporated in the HDPE, comonomers may be selected from butene and other $C_3$ to $C_{20}$ alpha olefins. In some implementations, the comonomers are selected from 1-butene, 4-methyl-1-pentene, 1-hexene, and 1-octene, and mixtures thereof.

Exemplary plastomers that may be utilized as polyolefin additive, may include ethylene-based plastomers. Suitable plastomers may be metallocene-based ethylene copolymers, such as C2-C4, C2-C6, or C2-C8 copolymers. Suitable plastomers may have a density lower than mLLDPE, such as 0.860-0.902 g/cm3. One exemplary family of suitable plastomers is the Exact® family of plastomers available from the ExxonMobil Chemical Company.

Rubber and Other Additives

As suggested previously, the films of the present disclosure, as with many films, may comprise various additives that are not counted as a portion of the weight percentages. Accordingly, the presence of these additives may result in a combined weight percent greater than 100%, as is conventional when describing polymer blends with additives. One exemplary additive may include a rubber component. The rubber component can include one or more olefinic rubbers such as non-polar, rubbery copolymers of two or more alpha-monoolefins, preferably copolymerized with at least one polyene, usually a diene. Saturated monoolefin copolymer rubber, for example, ethylene/propylene copolymer rubber (EPM; about 45 to about 80 wt % of ethylene) or unsaturated monoolefin rubber such as ethylene/propylene/diene (EPDM; about 45 to about 80 wt % of ethylene, about 0.1 to about 15 wt % of non-conjugated diene, remainder being propylene) rubber can be used. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD) and vinyl norbornene (VNB).

Another olefinic rubber can include a C4-7 isomonoolefin and a para-C1-4 alkylstyrene and, preferably, a halogenated derivative thereof. The amount of halogen in the copolymer, predominantly in the para-alkylstyrene, is from about 0.1 to 10 wt %. A preferred example is the brominated copolymer of isobutylene and para-methylstyrene. These copolymers are more fully described in U.S. Pat. No. 5,162,445, the disclosure of which is fully incorporated herein by reference.

The rubber component can also include one or more styrenic block copolymers. Such block-copolymers can include styrene/conjugated diene/styrene, with the conjugated diene optionally being fully or partially hydrogenated, or mixtures thereof. Generally this block-copolymer can contain about 10 to about 50 wt %, more preferably about 25 to about 35 wt % of styrene and about 90 to about 50 wt %, more preferably about 75 to about 65 wt % of the conjugated diene, based on said block-copolymer. Most preferably, however, is a block-copolymer which contains about 30 wt % of styrene and about 70 wt % of the conjugated diene. The conjugated diene can be selected from butadiene, isoprene or mixtures thereof. Specific block-copolymers of the styrene/conjugated diene/styrene-type are SBS, SIS, SIBS, SEBS and SEPS block-copolymers.

Butyl rubbers may also be used. The term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers. Useful butyl rubber copolymers include a major portion of isoolefin and a minor amount, usually less than about 30 wt %, of a conjugated multi-olefin. The preferred copolymers include about 85 to 99.5 wt % of a C4-7 isoolefin such as isobutylene and about 15 to 0.5 wt % of a multi-olefin of 4 to 14 carbon atoms, such as isoprene, butadiene, dimethyl butadiene and piperylene. Commercial butyl rubber, chlorobutyl rubber, and bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180, the disclosure of which is fully incorporated herein by reference.

Natural rubber may also be used. The main constituent of natural rubber is the linear polymer cis-1,4-polyisoprene. It is normally commercially available in the form of smoked sheets and crepe. Synthetic polyisoprene may also be used. Furthermore, polybutadiene rubber and styrene-butadiene-copolymer rubbers may also be used.

In one or more embodiments, nitrite rubbers can be used. Examples of a nitrite group-containing rubber include a copolymer rubber comprising an ethylenically unsaturated nitrite compound and a conjugated diene. Further, the copolymer rubber can be one in which the conjugated diene units of the copolymer rubber are hydrogenated. Specific examples of the ethylenically unsaturated nitrile compound include acrylonitrile, alpha-chloroacrylonitrile, alpha-fluoroacrylonitrile and methacrylonitrile. Among them, acrylonitrile is preferred. Examples of the conjugated diene include 1,3-butadiene, 2-chlorobutadiene and 2-methyl-1,3-butadiene (isoprene). Among them, butadiene is preferred. Preferred nitrite rubbers include copolymers of 1,3-butadiene and about 10 to about 50 percent of acrylonitrile.

In one or more embodiments, the polymer composition may include one or more slip agents. Illustrative slip agents include fatty acids, higher aliphatic acid amides, higher aliphatic acid esters, waxes and metal soaps. In one or more embodiments, the slip agents can include one or more amides such as behenamide, erucamide, N-(2-hydroxyethyl) erucamide, lauramide, N,N'-ethylene bis-olamide, oleamide, oleyl palmitamide, stearyl erucamide, tallow amide, blends thereof, and combinations thereof. In one or more embodiments, the slip agents are added to the blend in amounts ranging from about 0.1 to about 2 weight percent based on the total weight of the blend.

Blending and Additives

In one or more embodiments, the one or more propylene-based polymers, polyolefin additives, hydrocarbon resins, and/or other additives can be blended by melt-mixing to form a blend. In one or more embodiments, the blend contains no processing oil. In other words, the blend is processed in the absence of processing oil. The blend may be prepared and mixed using any appropriate method known to those having skill in the art, for example, extruders with kneaders or mixing elements with one or more mixing tips or flights, extruders with one or more screws, extruders of co- or counter-rotating type, Banbury mixers, Farrell Continuous mixers, or Buss Kneaders. The type and intensity of mixing, temperature, and residence time required can be achieved by the choice of one of the above machines in combination with the selection of kneading or mixing elements, screw design, and screw speed (typically <3000 RPM).

In one or more embodiments, the films described can be used as one or more layers in a multi-film or laminate system. For example, an elastic laminate having one or more facing layers disposed at least partially about one or more inner layers is provided. In an elastic laminate, any one or more layers may be formed according to the present description. While individual layers may be constituted differently to provide each layer with different properties, each layer may nonetheless be formed according to the present description. One of ordinary skill in the art of forming elastic laminates will be able to adapt individual layers according to the respective needs, such as incorporating more or less slip agent.

In some implementations, one or more of the layers may include at least 80 wt %, at least 85 wt %, at least 90 wt %, or at least 95 wt % of the propylene-based polymer. Additionally or alternatively, in some implementations, one or more of the layer may include the propylene-based polymer in an amount ranging from a low of about 80 or 85 wt % to a high of about 85, 90, or 95 wt %. In some implementations, one or more layers may include polyolefin additive and/or hydrocarbon resin in an amount ranging from a low of about 0.1, 5, 10, 15, or 20 wt % to a high of about 10, 15, or 20 wt %. In one or more implementations, the one or more layers may include about 80 wt % to about 95 wt % of the propylene-based polymer, about 5 wt % to about 20 wt % of the hydrocarbon resin, and about 5 wt % to about 20 wt % of polyolefin additive. Additionally or alternatively, in some implementations, the one or more layers may include about 80 wt % to about 95 wt % of the propylene-based polymer, about 5 wt % to about 15 wt % of the hydrocarbon resin, and about 5 wt % to about 15 wt % of polyolefin additive.

In one or more embodiments, the one or more layers may include from about 2 to about 30 wt % of the one or more slip agents. In one or more embodiments, the one or more layers may include from about 0.2 wt % to about 20 wt % of the one or more slip agents. In one or more embodiments, the one or more layers may include from about 0.2 wt % to about 10 wt % of the one or more slip agents. In one or more embodiments, the one or more layers may include from about 0.2 wt % to about 5 wt % of the one or more slip agents. In one or more embodiments, the one or more layers may include the one or more slip agents in an amount ranging from a low of about 0.2 wt %, 0.5 wt % or 1 wt % to a high of about 2 wt %, 5 wt % or 10 wt %.

In one or more embodiments, the inner layer or facing layer may contain additional additives, which can be introduced at the same time as the other components, or later downstream in case of using an extruder or Buss kneader, or merely later in time. Examples of such additives are antioxidants, antiblocking agents, antistatic agents, ultraviolet stabilizers, foaming agents, and processing aids. Such additives may include from about 0.1 to about 10 wt % based on the total weight of blend. The additives can be added to the blend by any method acceptable to persons skilled in the art, for example in pure form or in master batches.

Articles

The polymer composition described may be used to form a variety of articles, including but not limited to consumer and industrial goods. In some illustrative uses of the polymer compositions described herein, the polymer blend may be formed into a film through any conventional means. As described above, the polymer blends can be formed into laminated elastic materials or other film materials for use in a variety of consumer and industrial goods. The various manners of converting a polymer blend into a film are well-known in the art. Any suitable method may be used to form film-based articles utilizing the polymer compositions described herein.

Additionally or alternatively, the present polymer compositions may be formed into nonwoven materials for use in consumer and industrial goods. For purposes of this specification and the appended claims, "film" includes structures containing one or more layers of nonwoven, nonwoven fabric, nonwoven web, or combinations thereof. Illustrative consumer articles include but are not limited to incontinence pads, personal hygiene articles, disposable diapers, training pants, clothing, undergarments, sports apparel, face masks, gowns, and filtration media. The terms "nonwoven, "nonwoven fabric," and "nonwoven web," as used herein, are used interchangeably and refer to a web or fabric that has a structure of individual fibers or filaments that are randomly interlaid, but not in an identifiable repeating pattern.

The terms "elastic" and "semi-elastic" refer to any material having a tension set of 80% or less, or 60% or less, or 50% or less, or 25% or less at 100% elongation and at a temperature between the glass transition temperature and the crystalline melting point. Elastic polymer materials and compositions are also referred to in the art as "elastomers" and/or "elastomeric."

Preferably, a nonwoven fabric is layered with one or more facing layers thermally bonded to one or more inner layers. Each layer may be either spunbonded or meltblown to from a single fabric layer. Accordingly, the layered nonwoven fabric can include numerous combinations of spunbonded (S) and meltblown (M) layers including but not limited to spunbond-spunbond (SS), spunbond-meltblown-spunbond (SMS), spunbond-spunbond-spunbond (SSS), spunbond-meltblown-meltblown-spunbond (SMMS) spunbond-spunbond-spunbond-spunbond (SS-SS), spunbond-meltblown or vice versa (SM or MS), spunbond-meltblown-spunbond-spunbond-meltblown-spunbond (SMS-SMS), spunbond-meltblown-meltblown-spunbond-spunbond-meltblown-meltblown-spunbond (SMMS-SMMS) arrangements, as well as many other combinations and variations of the foregoing. The multiple fabric layers are then bonded together by the application of heat and pressure to form the desired fabric composite. The spunbonded fabric layers may be prebonded by heated press rolls to provide structural integrity to the fabric.

As mentioned above, the one or more facing layers may be thermally bonded to the one or more inner layers. The layers can be thermally bonded using a calendering process or any other process known in the art. It is believed that the inner layer(s) containing one or more slip agents and/or one or more hydrocarbon resins eliminates the "rubbery feel" that is intrinsic to an unmodified elastic nonwoven. As such, the modified elastic nonwoven has an appealing touch to the wearer.

As used herein, the terms "thermal bonding" and "thermally bonded" refer to the heating of fibers to effect the melting (or softening) and fusing of fibers such that a nonwoven fabric is produced. Thermal bonding includes calendar bonding and through-air bonding, as well as other methods known in the art.

Considering fabrics in more detail, melt blown fabrics are generally webs of fine filaments having a fiber diameter in the range of from about 0.1 to about 20 microns. Typical fiber diameters for melt blown fabrics are in the range of from 1 to 10 microns, or from 1 to 5 microns. The nonwoven webs formed by these fine fiber diameters have very small pore sizes and can, therefore, have excellent barrier properties.

The meltblown layers may be prepared by extruding the blend in molten form through a plurality of fine, usually circular capillaries of a die. A high-velocity, usually heated gas (e.g., air) stream attenuates the filaments of molten thermoplastic material to reduce their diameter. Thereafter the meltblown fibers, which include any melt processable additives that were present in the blend, are carried by the high-velocity heated gas stream and are deposited on a collecting surface to form a nonwoven web of randomly dispersed meltblown fibers.

The spunbonded layers may be produced by continuously extruding the blend through a plurality of fine, usually circular capillaries of a spinnerette having typically 1000 holes per meter length, or with banks of smaller spinnerets, with each spinneret section containing as few as 40 holes. After exiting the spinneret, the molten fibers are quenched by a cross-flow air quench system, then pulled away from the spinneret and attenuated (drawn) by high speed air. The friction between the flowing air and the filaments creates a force which draws the filaments, i.e., attenuates the filaments to a smaller diameter. The filaments are drawn to achieve molecular orientation and tenacity. The continuous filaments are then deposited in a substantially random manner to form a web of substantially continuous and randomly arranged, molecularly oriented filaments. The web is then passed through compaction rolls and then between heated calender rolls where the raised lands on one roll bond the web at points covering 10% to 40% of its area to form a nonwoven fabric. The top calender roll may have an embossed pattern while the bottom roll is typically smooth.

In one or more embodiments, any one of the one or more facing layers and the one or more inner layers may be a multicomponent layer. The term "multicomponent" as used herein, refers to fibers which have been formed from at least two polymers extruded from separate extruders and meltblown or spun together to form one fiber. Multicomponent fibers are also referred to in the art as bicomponent fibers. The polymers used in multicomponent fibers are typically different from each other; however, conjugated fibers can be monocomponent fibers. The polymers can be arranged in distinct zones across the cross-section of the conjugated fibers and extend continuously along the length of the conjugated fibers. The configuration of conjugated fibers can be, for example, a sheath/inner arrangement wherein one polymer is surrounded by another, a side by side arrangement, a pie arrangement or an "islands-in-the-sea" arrangement. Conjugated fibers are described in U.S. Pat. Nos. 5,108,820; 5,336,552; and 5,382,400; the entire disclosures of which are hereby incorporated herein by reference. In some embodiments, the fibers described herein may be part of a conjugated configuration.

In one or more embodiments, the fibers may be in the form of continuous filament yarn, partially oriented yarn, and/or staple fibers. Continuous filament yarns typically range from 40 denier to 20,000 denier (denier=number of grams per 9000 yards). Filaments generally range from 1 to 20 or more denier per filament (dpf). Spinning speeds are typically 800 m/min to 1500 m/min (2500 ft/min to 5000 ft/min).

Partially oriented yarn (POY) is the fiber produced directly from fiber spinning without solid state drawing, as in the continuous filament. The orientation of the molecules in the fiber is done in the melt state just after the molten polymer leaves the spinneret.

Staple fiber filaments can range, for example, from 1.5 dpf to 70 dpf or more, depending on the application. There are two basic staple fiber fabrication processes: traditional and compact spinning. The traditional process typically involves two steps: 1) producing, applying, finishing, and winding; followed by 2) drawing, a secondary finish application, crimping, and cutting into the staple. During the traditional spinning process, a 'triangle' is created as fibers are drawn out of an apparatus. Compact spinning minimizes or eliminates the triangle, and may reduce the amount of stray fibers and weak spots in a thread. It is called 'compact' because outside fibers are compacted towards the core of the yarn as they are twisted.

In some embodiments, the fabrics can be further processed. For example, the fabric can be subjected to a surface treatment process, such as sizing. Thus, in some embodiments, the fabric can contain sizing additives such as rosins, resins, or waxes. As another example, the fabric can be subjected to a tentering process. In one or more embodiments above, blocking agents can be added to the fabric in a processing step subsequent to the formation of the fabric.

Definitions and Test Methods

For purposes of convenience, various definitions and specific test procedures are identified below. However, if a person of ordinary skill wishes to determine whether a composition or polymer has a particular property identified in a claim herein, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with gel permeation chromatography (GPC), as described in Wheeler and Willis, Applied Spectroscopy, 1993, Vol. 47, pp. 1128-1130.

In the particular case of propylene-ethylene copolymers containing greater than 75 wt % propylene, the comonomer content may be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher.

Polyene content: The amount of polyene present in a polymer may be inferred by the quantitative measure of the amount of the pendant free olefin present in the polymer after polymerization. Several procedures such as iodine number and the determination of the olefin content by H$^1$ or $^{13}$C nuclear magnetic resonance (NMR) have been established. In embodiments described herein where the polyene is ENB, the amount of polyene present in the polymer can be measured using ASTM D-3900.

Isotactic: The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm' If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}$C nuclear magnetic resonance (NMR) spectrum of the polymer as described below and as described in U.S. Pat. No. 5,504,172, the disclosure of which is hereby incorporated herein by reference.

Tacticity Index: The tacticity index, expressed herein as "m/r", is determined by $^{13}$C nuclear magnetic resonance (NMR). The tacticity index m/r is calculated as defined in H. N. Cheng, *Macromolecules, pg.* 17, 1950 (1984). An m/r ratio of 1.0 generally describes a syndiotactic polymer, and an m/r ratio of 2.0 generally describes an atactic material. An isotactic material theoretically can have a ratio approaching infinity, and many by-product atactic polymers have sufficient isotactic content to result in ratios of greater than 50.

Melting point and heat of fusion: The melting point (Tm) and heat of fusion of the polymers described herein can be determined by Differential Scanning Calorimetry (DSC), using the ASTM E-794-95 procedure. About 6 to 10 mg of a sheet of the polymer which has been pressed at approximately 200° C. to 230° C. is removed with a punch die and annealed at room temperature for 48 hours. At the end of this period, the sample is placed in a Differential Scanning Calorimeter (Perkin Elmer Pyris One Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Molecular weight and molecular weight distribution: The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where Ni is the number of molecules having a molecular weight Mi. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., Polymer Molecular Weights Part II, Marcel Dekker, Inc., NY, (1975) pp. 287-368; Rodriguez, F., Principles of Polymer Systems 3$^{rd}$ ed., Hemisphere Pub. Corp., NY, (1989) pp. 155-160; U.S. Pat. No. 4,540,753; Verstrate et al., Macromolecules, Vol. 21, (1988) pg. 3360; and references cited therein.

Mooney viscosity: Mooney viscosity, as used herein, is measured as ML(1+4) @ 125° C. according to ASTM D-1646.

Melt flow rate and melt index: The determination of the Melt Flow Rate (MFR) and the Melt Index (MI) of the polymer is made according to ASTM D-1238 using modification 1 with a load of 2.16 kg. In this version of the method, a portion of the sample extruded during the test is collected and weighed. The sample analysis is conducted at 230° C. with a 1 minute preheat on the sample to provide a steady temperature for the duration of the experiment. This data, expressed as dg of sample extruded per minute, is indicated as MFR. In an alternative procedure, the test is conducted in an identical fashion except at a temperature of 190° C. This data is referred to as MI@190° C.

Isotacticity Index: The isotacticity index is calculated according to the procedure described in EP 0 374 695A2. The IR spectra of a thin film of the material is recorded and the absorbance at 997 cm$^{-1}$ and the absorbance at 973 cm$^{-1}$ are determined. The quotient of the absorbance at 997 cm$^{-1}$ to the absorbance at 973 cm$^{-1}$ is multiplied by 100 to yield the isotacticity index. In the determination of the absorbance at these two positions, the position of zero absorbance is the absorbance when there is no analytical sample present in the sample beam.

EXAMPLES 1-3

The foregoing discussion may be further described with reference to the following non-limiting examples. The examples illustrate the advantages and effects of films having one or more hydrocarbon resins added to one or more propylene-based polymers. The examples formulated according to one or more embodiments described provided films with significantly improved tear properties with minimal to no loss in elastic properties. The most notable improved tear property was intrinsic tear. Such films were nothing short of surprising and unexpected.

The samples were compression molded per ASTM D 4703-03 to 4-6 mil. Hysteresis tests were run on compression molded specimens in a tensile tester to an extension of 100% or 300% and returned to zero load. The tests were performed at a cross head speed of 508 mm/min. The test condition corresponding to the first cycle is designated "as is," and the second cycle is designated as "pre stretch." The pre stretch test conditions also correspond to 100% or 300% extension and return to zero load. Permanent set and load loss properties as defined below were calculated for both "as is" and "pre stretch" conditions.

Permanent Set (%): Strain level corresponding to zero force on return, upon stretching a film to 100% extension. This can be done either in the machine direction or the transverse direction.

Load Loss (%): (Load on Ascending Curve—Load on Descending Curve)/Load on Ascending calculated at the 50% strain level.

Hysteresis (lb-in/in): Area enclosed by the ascending and descending portion of the load displacement curve.

Mechanical Hysteresis (lb-in/in): Area under the ascending portion of the load displacement curve.

Hysteresis (%): Hysteresis/Mechanical Hysteresis.

PS: Pre stretch to 100% strain.

Intrinsic tear was measured according ASTM D-1922-03.

Tensile tests were performed according to ASTM D-638

EXAMPLE 1

Table 1 shows blend examples comprising a propylene-based polymer designated Copolymer A (available from ExxonMobil Chemical Company), a styrenic block copolymer (D4211) and hydrocarbon resin based polymer additive (PR 100A), compounded in a 30 mm ZSK twin screw extruder. The ingredients were tumble blended to a total weight of 5000 gm, and introduced into the hopper of the twin screw extruder. The melt temperature was maintained at 210° C. The extrudate was cooled in a water trough and pelletized for testing.

Example C1 is a comparative example based on Copolymer A that was not compounded, and directly converted to test specimens. Example 2 shows a recipe containing 15 wt % PR 100A. As seen in Table 1, the intrinsic tear properties were substantially enhanced from 1.6 gm/micron for C1 to 3.9 gm/micron for Example 2. Both permanent set and load loss remained essentially unchanged. Copolymer A is a propylene-based polymer containing about 16 wt % ethylene, 3 g/10 min MFR, and a heat of fusion of about 5 J/g.

Example 3 contained D4211 as a third ingredient. This example exhibited a substantial increase in intrinsic tear relative to C1 (2.6 gm/micron) without compromising the elastic properties.

TABLE 1

Properties of Copolymer A films modified with PR 100A

| | | EXAMPLE | | |
|---|---|---|---|---|
| | | C1 | 2 | 3 |
| Copolymer A | | 100.0 | 85.0 | 70.0 |
| D4211 (14.3 MFR, 0.936 d) | | 0.0 | 0.0 | 21.5 |
| PR 100A | | 0.0 | 15.0 | 8.5 |
| Irganox 1010 | | 0.5 | 0.5 | 0.5 |
| Total | | 100.5 | 100.5 | 100.5 |
| Compression Molded to 9 mil (0.23 mm) thickness | | | | |
| MFR (230° C., 2.16 Kg) | g/10 min | 3.0 | 4.7 | 5.5 |
| Tensile @ Yield[1] | MPa | 0.9 | 0.1 | 0.7 |
| Tensile @ Brk | MPa | 12.2 | 9.4 | 10.0 |
| Elongation @ Yield | % | 10 | 10 | 10 |
| Elongation @ Brk | % | 757 | 856 | 805 |
| Intrinsic Tear (Average thickness = 0.102 mm) | g/micron | 1.6 | 3.9 | 2.6 |
| Hysterisis As Is (100% Stretch) | | | | |
| Set | % | 19 | 12 | 20 |
| Load Loss @ 50% strain | % | 44 | 45 | 21 |
| Hysteresis Prestretch to 100% and 100% Stretch | | | | |
| Set | % | 18 | 19 | 19 |
| Load Loss @ 50% strain | % | 38 | 44 | 46 |
| Hysterisis As Is (300% Stretch) | | | | |
| Set | % | 50 | 50 | 50 |
| Load Loss @ 150% strain | % | 57 | 57 | 57 |
| Hysterisis Prestretch to 300% and 300% Stretch | | | | |
| Set | % | 46 | 46 | 46 |
| Load Loss @ 150% strain | % | 44 | 44 | 44 |

[1]Thickness: 0.31 mm, Speed 508 mm/mm, Width 25.4 mm, Length 102 mm)

EXAMPLE 2

Table 2 shows examples of Copolymer A blended with hydrocarbon resin based additives PR 103J or PR 100A in a laboratory PRISM extruder. A batch weight of 500 gm, wherein the ingredients were homogenized though tumble blending, was selected for all the examples. Extrusion compounding was completed at a melt temperature of 210° C., and the extrudates were collected as a solid mass in a cardboard boat spray-coated with silicone to facilitate release. The compound was reduced to smaller fragments in a guillotine and compression molded into test specimens.

From Table 2, it is evident that the addition of PR 103J at progressively increasing levels (Examples 5 through 7) enhanced intrinsic tear properties relative to the comparative example C4, without affecting elastic properties. A similar trend was observed with PR 100A, although in this case about 10 wt % (Example 9) appears to have provided the optimal enhancement. Surprisingly, a further increase beyond this level resulted in a marginal loss of tear properties as evidenced in Examples 10 and 11. The elastic properties of examples 9 through 11 were similar or in some cases marginally better than the comparative C4. In particular, the permanent set at 300% extension was around 33% in Examples 9 through 11 compared to 42% in comparative C4.

TABLE 2

Copolymer A films modified with mixtures of PR additives

| | | EXAMPLE | | | | | | | |
|---|---|---|---|---|---|---|---|---|---|
| | | C4 | 5 | 6 | 7 | 8 | 9 | 10 | 11 |
| Copolymer A | | 100.0 | 90.0 | 85.0 | 80.0 | 80.0 | 90.0 | 85.0 | 80.0 |
| PR 103J | | 0.0 | 10.0 | 15.0 | 20.0 | 20.0 | 0.0 | 0.0 | 0.0 |
| PR 100A | | 0.0 | 0.0 | 0.0 | 0.0 | 8.5 | 10.0 | 15.0 | 20.0 |
| Irganox 1010 | | 0.0 | 0.5 | 0.5 | 0.5 | 0.5 | 0.5 | 0.5 | 0.5 |
| Total | | 100.0 | 100.5 | 100.5 | 100.5 | 109.0 | 100.5 | 100.5 | 100.5 |
| Compression Mold to 9 mil (0.23 mm) thickness | | | | | | | | | |
| Hardness | Shore A | 46.0 | 42.0 | 39.0 | 40.0 | 35.0 | 42.0 | 40.0 | 40.0 |
| 1% Secant Modulus | MPa | 9.5 | 8.2 | 6.5 | 4.6 | 8.7 | 9.9 | 7.0 | 7.0 |
| Tangent Modulus | MPa | 11.6 | 7.6 | 7.1 | 5.2 | 5.7 | 7.1 | 6.6 | 6.7 |
| Intrinsic Tear (Average = 0.102 mm) | gm/micron | 1.3 | 1.5 | 1.8 | 2.6 | 3.9 | 3.7 | 2.5 | 3.2 |
| Hysterisis As Is (100% Stretch) | | | | | | | | | |
| Set | % | 7 | 7 | 8 | 8 | 8 | 8 | 8 | 7 |
| Load Loss @ 50% strain | % | 38 | 36 | 37 | 37 | 36 | 38 | 37 | 38 |
| Hysterisis Prestretch to 100% and 100% Stretch | | | | | | | | | |
| Set | % | 6 | 6 | 7 | 8 | 7 | 7 | 7 | 5 |
| Load Loss @ 50% strain | % | 26 | 27 | 26 | 29 | 28 | 27 | 27 | 28 |
| Hysterisis As Is (300% Stretch) | | | | | | | | | |
| Set | % | 42 | 34 | 32 | 33 | 32 | 33 | 32 | 33 |
| Load Loss @ 150% strain | % | 59 | 57 | 56 | 54 | 55 | 57 | 56 | 56 |
| Hysterisis Prestretch to 300% and 300% Stretch | | | | | | | | | |
| Set | % | 34 | 28 | 29 | 31 | 30 | 28 | 29 | 29 |
| Load Loss @ 150% strain | % | 45 | 41 | 42 | 42 | 42 | 43 | 43 | 42 |

EXAMPLE 3

Table 3 shows examples 13-19 containing propylene-based polymers, Copolymer B or Copolymer C, with styrenic block polymer D4211 and PR 103J polymer additive. Copolymer B is a propylene-based polymer containing about 15 wt % ethylene, 3 g/10 min MFR, and a heat of fusion of about 5 J/g. Copolymer C is a propylene-based polymer containing about 14 wt % ethylene, 20 g/10 min MFR, and a heat of fusion of about 10 J/g.

Examples 13-19 were prepared in a 30 mm ZSK twin screw extruder as outlined in Example 1. The comparative examples C12 and C16 were 70/30 blends of Copolymer B and Copolymer C, respectively, with D4211. In Examples 13 and 14, PR 103J was added at the expense of Copolymer B while maintaining the D4211 resin level at 30 wt %. In Example 15, the D4211 was dropped to 15 wt %. Examples 17 through 19 illustrated a similar trend with Copolymer C (20 MFR) as the base resin instead of Copolymer B. Examples 13 through 15 displayed higher tear properties compared to comparative example C12 with a comparable or marginal decrease in elastic properties. Similarly, Examples 17 through 19 exhibited higher tear properties compared to comparative example C16 while maintaining elastic properties.

TABLE 3

Properties of copolymer films modified with PR103J

| | C12 | 13 | 14 | 15 | C16 | 17 | 18 | 19 |
|---|---|---|---|---|---|---|---|---|
| Copolymer B | 70 | 60 | 55 | 65 | 0 | 0 | 0 | 0 |
| Copolymer C | 0 | 0 | 0 | 0 | 70 | 60 | 55 | 65 |
| D4211 | 30 | 30 | 30 | 15 | 30 | 30 | 30 | 15 |
| PR103J | 0 | 10 | 15 | 20 | 0 | 10 | 15 | 20 |
| Irganox 1010 | 0.5 | 0.5 | 0.5 | 0.5 | 0.5 | 0.5 | 0.5 | 0.5 |
| Total | 100.5 | 100.5 | 100.5 | 100.5 | 100.5 | 100.5 | 100.5 | 100.5 |
| Compression Mold to 9 mil (0.23 mm) thickness | | | | | | | | |
| MFR (230° C., 2.16 Kg) g/10 min | 6.6 | 9.3 | 17.7 | 16.8 | 22.1 | 35.2 | 39.3 | 41.3 |
| Tensile @ Yield MPa | 1.0 | 0.8 | 0.7 | 0.6 | 1.0 | 0.7 | 0.7 | 0.7 |
| Tensile @ Brk MPa | 19.9 | 18.7 | 17.4 | 10.5 | 10.7 | 10.1 | 9.2 | 8.3 |
| Elongation@Yield % | 10 | 11 | 12 | 11 | 11 | 10 | 8 | 13 |
| Elongation@Brk % | 985 | 1002 | 1058 | 906 | 992 | 1080 | 1137 | 1111 |
| Intrinsic Tear (Average = 0.10 mm) gm/micron | 2.1 | 2.5 | 3.1 | 5.4 | 1.6 | 2.2 | 3.1 | 4.4 |

TABLE 3-continued

Properties of copolymer films modified with PR103J

|  | C12 | 13 | 14 | 15 | C16 | 17 | 18 | 19 |
|---|---|---|---|---|---|---|---|---|
| Hysterisis (300% Stretch) | | | | | | | | |
| Set % | 50 | 50 | 50 | 53 | 48 | 50 | 52 | 53 |
| Load Loss @ 150% strain % | 57 | 56 | 52 | 59 | 60 | 56 | 54 | 61 |
| Hysterisis (300% Stretch) | | | | | | | | |
| Set % | 46 | 46 | 49 | 54 | 48 | 48 | 53 | 55 |
| Load Loss @ 150% strain % | 44 | 41 | 41 | 46 | 44 | 41 | 44 | 51 |

EXAMPLE 4

In this Example 4, various polymer blends were compounded in a ZSK-30 twin-screw extruder using compounding conditions conventional for polypropylene compounding. The compounds exiting the extruder were strand cut into pellets and then converted into 100 μm (3.9 mil) monolayer cast films using 1" Killion line. Films were then conditioned at about 23° C. for about 40 hours. Copolymer D is a propylene-based polymer having about 16 wt % polyethylene and about 3 MFR. Copolymer E is a propylene-based polymer having higher crystallinity than Copolymer D, about 12 wt % polyethylene, and about 2 MFR. Exact 5371 is an ethylene-base polymer having a higher crystallinity than Copolymer D having a density of 0.870 g/cc and 3.5 MFR, which is commercially available from ExxonMobil Chemical Company of Baytown, Tex., USA. PR100A is representative of a hydrocarbon resin described herein and is commercially available from ExxonMobil Chemical Company of Baytown, Tex., USA. Irganox 1010 is also commercially available from various sources. The polymer blends compounded in this Example 4 are shown in Table 4. As seen in the data below, Examples 21-23 increased the mechanical properties, such as tensile strength, elongation, and tear strength without significantly affecting, and in some cases actually lowering, the load loss and the tension set. In at least the case of Example 23, TD tensile strength was increased by over 100%, TD tear strength was increased by over 60%, and the tension set and load loss were each decreased.

TABLE 4

Properties of copolymer films modified with PR100A

|  | Sample | | | |
|---|---|---|---|---|
|  | C20 | 21 | 22 | 23 |
| Copolymer D | 100 | 80 | 80 | 80 |
| PR100A | 0 | 20 | 10 | 10 |
| Exact 5371 | 0 | 0 | 10 | 0 |

TABLE 4-continued

Properties of copolymer films modified with PR100A

|  | Sample | | | |
|---|---|---|---|---|
|  | C20 | 21 | 22 | 23 |
| Copolymer E | 0 | 0 | 0 | 10 |
| Irganox 1010 | 0 | 0.5 | 0.5 | 0.5 |
| Total | 100.5 | 100.5 | 100.5 | 100.5 |
| Cast film at nominal 3.9 mil (100 μm) thickness | | | | |
| Loading Stress at 100% (psi) | 251.0 | 198.5 | 183.0 | 210.0 |
| Load at 100% (N) | 4.4 | 3.4 | 3.2 | 3.6 |
| Loading Stress at 50% (psi) | 202.4 | 158.8 | 146.8 | 169.0 |
| Unloading Stress at 50% (psi) | 128.5 | 100.6 | 94.0 | 110.0 |
| Load Loss (%) | 36.5 | 36.6 | 36.0 | 34.9 |
| Tension Set (%) | 10.6 | 13.9 | 11.9 | 8.1 |
| TD Tensile (psi) | 1723 | 2882 | 3252 | 3876 |
| TD Tensile (MPa) | 11.9 | 19.9 | 22.4 | 26.7 |
| TD Elongation (%) | 795 | 863 | 923 | 876 |
| TD Tear Strength (g/mil) | 93 | 177 | 103 | 158 |

EXAMPLE 5

For this Example 5, a total of eight (8) compounds were melt mixed and pelletized using a 30 mm ZSK co-rotating twin-screw extruder with a strand cut pelletizer. Table 5 below gives compound definitions, Table 6 defines the raw materials used, and Table 7 gives typical extruder conditions for each of the compounds.

TABLE 5

Compound Definitions

|  | 24 | 25 | 26 | 27 | 28 | 29 | 30 | 31 | 32 |
|---|---|---|---|---|---|---|---|---|---|
| Copolymer D | 100 | 80 | 80 | 80 | 80 | 80 | 80 | 80 | 80 |
| Copolymer E | 0 | 10 | 5 | 15 | 20 | 0 | 0 | 0 | 0 |
| Copolymer F | 0 | 0 | 0 | 0 | 0 | 0 | 10 | 0 | 0 |
| Copolymer G | 0 | 0 | 0 | 0 | 0 | 0 | 0 | 10 | 0 |
| Exceed 3512CB | 0 | 0 | 0 | 0 | 0 | 0 | 0 | 0 | 10 |
| PR100A | 0 | 10 | 15 | 5 | 0 | 20 | 10 | 10 | 10 |

TABLE 6

Raw Material Definitions

|  | Density (g/cm³) | Melt Index, I2 @ 190° C. (dg/min) | Ethylene Content (wt %) | Tg (° C.) | Molecular Weight (Mw) (g/mol) | Viscosity, 160° C., (cPs) |
|---|---|---|---|---|---|---|
| Copolymer D | 0.862 | 1.3 | 16 | −31 | 225,000 | — |
| Copolymer E | 0.873 | 0.9 | 11 | −27 | 290,000 | — |

TABLE 6-continued

Raw Material Definitions

| | Density (g/cm³) | Melt Index, I2 @ 190° C. (dg/min) | Ethylene Content (wt %) | Tg (° C.) | Molecular Weight (Mw) (g/mol) | Viscosity, 160° C., (cPs) |
|---|---|---|---|---|---|---|
| Copolymer F | 0.879 | 3.3 | 9 | −20 | 200,000 | — |
| Copolymer G | 0.871 | 3.5 | 11 | −25 | 186,000 | — |
| Exceed 3512CB | 0.912 | 3.5 | — | <−30 | — | — |
| PR100A | — | — | — | 90 | — | 5200 |

TABLE 7

XSK-30 Extruder Conditions

| | Units | 25 | 26 | 27 | 28 | 29 | 30 | 31 | 32 |
|---|---|---|---|---|---|---|---|---|---|
| Die Pressure | Psi | 842 | 706 | 655 | 723 | 656 | 694 | 474 | 707 |
| Screw RPM | RPM | | | | | 150 | | | |
| Feed Throat Zone | ° C. | 132 | | | | 149 | | | |
| Zone 1 and 2 | ° C. | 135 | | | | 160 | | | |
| Zone 3 | ° C. | 138 | | | | 171 | | | |
| Zone 4 and 5 | ° C. | 135 | | | | 160 | | | |
| Die Zone | ° C. | 132 | | | | 143 | | | |
| Melt Temperature | ° C. | 159 | 170 | 169 | 171 | 169 | 171 | 164 | 172 |

The compounds described above were then cast into approximately 102 μm film using a Killion mini-cast line. The Killion mini-cast line is equipped with 3-extruders and can produce 5 layer coex structures out of a 20 cm slit die. Only the 25 mm extruder was used for this Example 5 as all structures produced were monolayer. Table 8 shows the cast line conditions used. It is noted here that Example film #24 is fabricated from Copolymer D unblended with other additives. Accordingly, commercially available pellets of Copolymer D were fed directly to the cast extruder and were not processed through the ZSK-30 Extruder of Table 7.

TABLE 8

Cast Line Conditions

| | Units | 24 | 25 | 26 | 27 | 28 | 29 | 30 | 31 | 32 |
|---|---|---|---|---|---|---|---|---|---|---|
| Zone 1 | ° C. | 133 | 127 | 132 | 129 | 130 | 134 | 128 | 132 | 132 |
| Zone 2 | ° C. | 171 | 165 | 164 | 166 | 167 | 167 | 167 | 166 | 166 |
| Zone 3 | ° C. | 171 | 173 | 174 | 176 | 174 | 170 | 174 | 169 | 171 |
| Adapter 1 | ° C. | 177 | 177 | 176 | 177 | 177 | 177 | 177 | 177 | 177 |
| Adapter 2 | ° C. | 177 | 177 | 177 | 77 | 177 | 178 | 177 | 177 | 177 |
| Die/Feedblock | ° C. | 177 | 177 | 176 | 177 | 177 | 177 | 177 | 177 | 177 |
| Melt Temperature | ° C. | 176 | 180 | 178 | 182 | 177 | 173 | 180 | 174 | 175 |
| Pressure | MPa | 20.5 | 17.4 | 16.3 | 18.9 | 20.2 | 16.2 | 17.6 | 17.2 | 17.0 |
| Extruder Speed | RPM | 103 | 102 | 103 | 102 | 102 | 103 | 103 | 103 | 103 |
| Line Speed | m/min | 2.0 | 2.0 | | 2.0 | 2.0 | 2.1 | 1.8 | 2.1 | 2.3 |
| Chill Roll Temp | ° C. | 12 | 13 | 12 | 12 | 12 | 12 | 11 | 12 | 12 |

Following a minimum of two weeks of aging within an ASTM controlled lab, the films defined above (samples 24-32) were tested for both mechanical and elastic properties using tests as described above. In order to measure elastic performance of the films, stress-strain cycle testing (i.e. hysteresis cycle) was conducted on each film. In all cases, the hysteresis cycle measurement was taken only in the film's transverse direction and represented as the cycle 1 response unless otherwise noted. For cast films, the transverse (or cross) direction is usually the direction most interesting for elastic properties as it is in this process direction that is less affected by molecular orientation. That is, the transverse direction usually shows the highest level of elasticity as measured by hysteresis, load loss, and/or tension set.

The hysteresis test procedure used during this study utilized a 2.54 cm×10.16 cm sample that was cut and tested by cycling two (2) times between 0% and 200% extension from a 5.1 cm initial gauge length at a crosshead speed of 50.8 cm/min. There was a hold of 30 seconds at 200% extension during each cycle and a 60 second hold between each cycle. The test is performed on an Instron or similar instrument. Also, the instrument is programmed to have a pre-load of 4.0 g at 2.54 cm/min for run-time slack correction. The force relaxation, percent of permanent set, mechanical hysteresis, and forces at user specified extension points are calculated from resultant force-extension curve.

With so many samples in the study, a comparative analysis was used to analyze the data. More specifically, the data set was analyzed for interesting property balances by normalizing the data relative to the reference, which in this Example 5 is sample #24 or neat Copolymer D. The next set of charts will highlight elasticity vs. mechanical properties by performance relative to the reference. Therefore, the reference sample #24 will always be positioned at the origin. Treatment of the data in this way allows the ability to quickly highlight those compounds that may offer some enhancement over the reference.

For simplicity, elastic performance will be depicted by tension set in all property balance observations. In general, mechanical hysteresis correlates strongly with tension set and thus tension set will serve as proxy for overall elastic performance.

FIG. 1 shows Δ tensile strength versus Δ tension set. The delta tensile property shown here is an average of MD and TD tensile at break. As mentioned in the above paragraph, the neat sample #24 film is positioned at the origin. As an example of how to read this chart, please refer to data point labeled #31. This data point represents film #31 and has a Δ tension set α-axis) roughly 20% LOWER than the reference sample #24. In addition, film #31 has a Δ tensile strength (y-axis) value approximately 30% higher than the reference sample #24. This particular compound shows enhancement to the elasticity-tensile strength balance. Film #32 also shows improvement to the tension set vs. tensile strength balance (i.e., decreasing tension set while increasing tensile strength). The data illustrated in FIG. 1 shows this compound has approximately 10% lower tension set and 30% higher tensile strength relative to the reference compound, Copolymer D. As can be seen in Table 5, this film contains 10% Exceed 3518, which is an ethylene-based polymer having a higher crystallinity than Copolymer D, along with the PR100A at 10%. It is believed that this is the first time that an mLLDPE has been blended with a propylene-based polymer and a hydrocarbon resin. Accordingly, it can be seen that the polyolefin additive may be propylene-based, as in sample film #31, or ethylene-based, as in sample film #32.

One observation that can be made from the comparisons shown in FIG. 1 relates to the potential impact of the molecular weight of the higher crystallinity polyolefin additive. For example, the compounds of sample #25 and sample #31 are identical except for exchanging Copolymer E (molecular weight ~290,000 g/mol) (sample #25) for Copolymer G (molecular weight ~186,000) (sample #31). As seen in FIG. 1, sample #31 showed significant improvement in both tension set and tensile strength while sample #25 showed a decrease in tensile strength. Copolymer G and E have very similar crystallinity but differing molecular weights, with Copolymer G having a lower Mw. While not conclusive, one of ordinary skill in the art will recognize that optimization of both mechanical properties and elastic properties may depend on more than just crystallinity and will be able to select appropriate polyolefin additives through routine experimentation with the assistance of the present disclosure.

A careful comparison on the data in Example 4 and Example 5 reveals that sample #23 of Example 4 and sample #25 of Example 5 are practically identical in composition but yield very different results, at least in comparing the tensile strength of the films. Without being bound by theory, one possible explanation of these differences may lie in differences in pre-compounding conditions between the studies that make up Examples 4 and 5. Table 9 below shows a comparison of the pre-compounding conditions for sample #23 and sample #25. In theory, the compositions of Copolymers D and E are highly compatible and should have a fairly broad miscibility window. However, it should be noted that there were differences in extruder conditions between the two runs, specifically screw speed and temperature conditions throughout the process. The higher screw rotation rate and higher temperatures utilized on sample #23 may have resulted in melt blending with higher mixing efficiency than was accomplished in sample #25. Higher shear and dispersive mixing may have resulted in more uniformly mixed components in sample #23, which may have led to overall better film physical properties. Here again, one of ordinary skill in the art will recognize that operation variables such as these will also have an impact on the properties of the end products. While use of a higher crystallinity polyolefin additive is not a guarantee of enhanced mechanical and elastic properties, it is seen to contribute to improving both the mechanical properties and the elastic properties when the proper processing conditions are utilized. Such proper processing conditions are expected to be readily identifiable by those of skill in the art in this area.

The foregoing analysis of the differences between samples #23 and #25 may shed further light on the reasons for which sample #31 exhibited such favorable property improvements in both tension set and tensile strength. As discussed above, sample 31 exchanged Copolymer G for Copolymer E (in comparison to sample #25). The lower molecular weight of Copolymer G would make it easier to disperse even in a lower shear environment. In light of the experimental scales of the results illustrated here, it is expected that under commercial scale operation, where efficient mixing is maintained, the results of samples #23 and #31 are more representative of the results obtainable by following the present disclosure, rather than the results of sample #25. Accordingly, the combined learning from Examples 4 and 5 reinforces the teachings of the present disclosure. Specifically, the combined learning is that, with effective mixing, the combination of a propylene-based polymer, a hydrocarbon resin, and a polyolefin additive having a higher crystallinity than the propylene-based polymer provides a polymer blend having increased or enhanced mechanical properties without sacrificing elastic properties.

Figure 2:
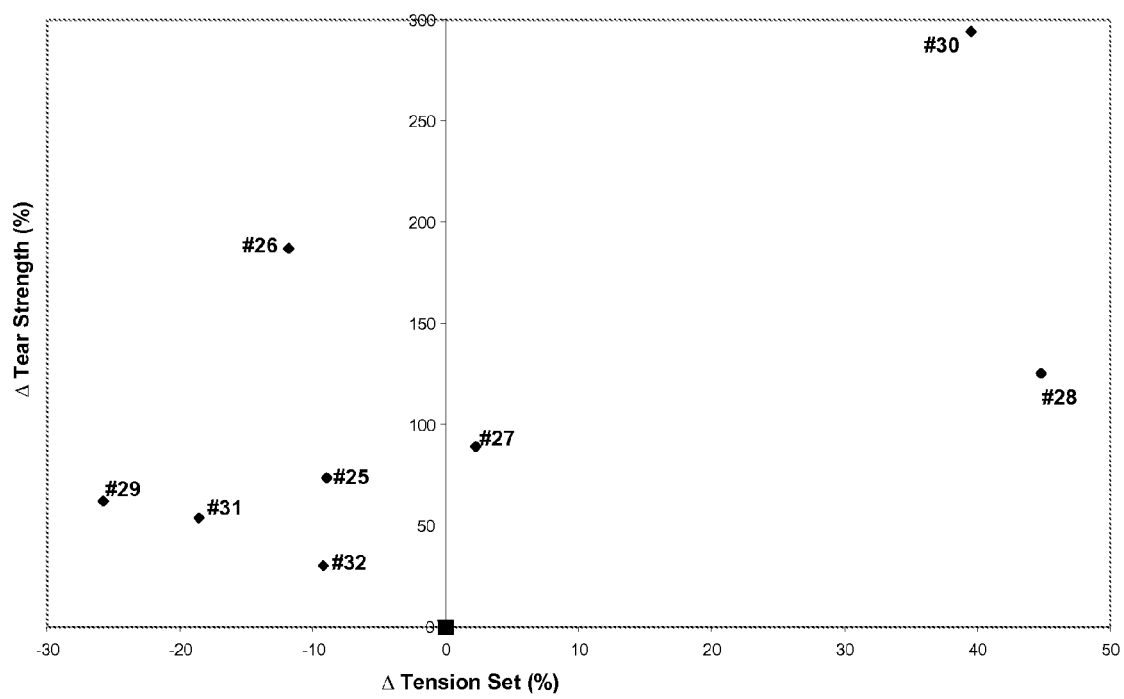
FIG. 2 illustrates the tear strength and tension set of various samples relative to the reference sample.

FIG. 1 was helpful to illustrate the relationship between tension set and tensile strength, and particularly the percentage change between the reference compound and compounds within the scope of the present disclosure. As with FIG. 1, FIG. 2 illustrates the difference in tear strength and tension set compared to the reference compound, sample film #24. As can be seen, enhancing the elasticity-tear balance seems to easier than the elasticity-tensile balance as most compounds fall within the quadrant emphasizing this enhancement. In FIG. 2 it can be seen that two of the eight samples showed significantly decreased elastic performance (i.e., increased tension set). However, the majority of the samples are found in the preferred quadrant with improved tear strength and improved or slightly impacted tension set. It should also be noted that the two outliers in FIG. 2, sample films #28 and 30, were also the most significant outliers in FIG. 1. Considering that sample film #28 does not include the hydrocarbon resin of the present disclosure, its poor elastic performance is to be expected. With respect to sample film #30, its elasticity performance may be attributable to Copolymer F, which was not used in other sample films, or to a variety of other factors as discussed above, including the possibility of experimental variance. Copolymer F has the highest crystallinity of all of the polyolefin additives tested in this Example 5, which may explain the observed decrease in elasticity.

FIG. 2 highlights the six compositions that provided some enhancement to both tear and elasticity. Sample film #26 gives rise to almost a 200% increase in tear strength with a slight improvement in tension set. The film #26 composition contains 80 wt % Copolymer D, 5 wt % Copolymer E, and 15 wt % PR100A. This data, along with data regarding sample film #29, supports the present disclosure's teachings that the addition of hydrocarbon resins (PR100A) to propylene-based polymers (Copolymer D) yields enhanced tear properties without sacrificing elasticity. Sample film #26 is also noteworthy in comparison to sample films #25 and 27, which are variants on the composition of sample #26. Assuming comparable mixing efficiencies and processing conditions between the three samples, and without being bound by theory, it is presently believed that there may be some synergy at a particular blend ratios of hydrocarbon resin and polyolefin additive that promotes both good elastic performance and a significant improvement in tear properties. Regardless of the precise differences between these six samples and the optimization of blend ratios, what can be seen in FIG. 2 is that the combination of the present disclosure (i.e., a propylene-based polymer, a hydrocarbon resin, and a polyolefin additive as described herein) results in an increased tear strength and a decreased, or minimally affected, tension set. For example, in each of these six samples, it can be seen that the tension set is less than 5% higher than the reference composition propylene-based polymer alone. Additionally, it can be seen that the tear strength is greater than the reference composition, even greater than 20% higher than the reference composition. In some instances, the tear strength is increased by over 50% while the tension set is decreased compared to the reference sample.

Figure 3:
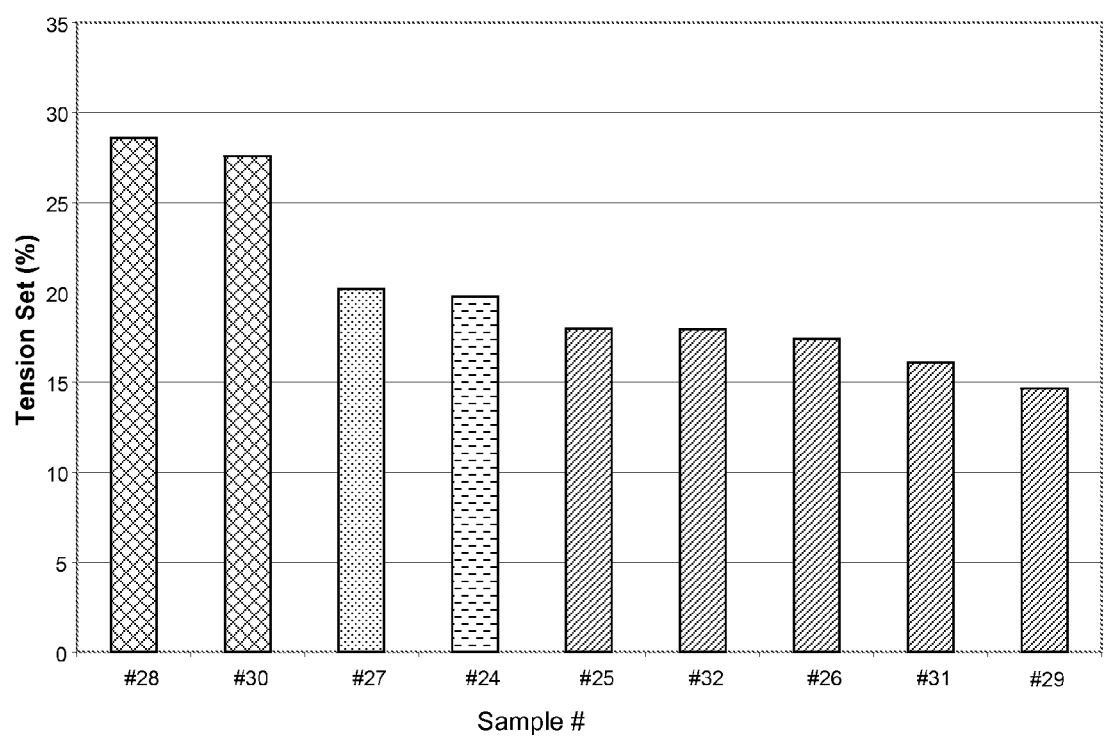
FIG. 3 illustrates the tension set of various samples, including the reference sample.

While the foregoing discussion and Figures have highlighted the impact on tension set for each of the sample compounds considered in this Example 5, FIG. 3 illustrates the absolute tension set values of each sample rather than the relative differences. For example, the reference sample #24 is shown as having a tension set percentage of just below 20%. As illustrated in FIGS. 1 and 2, samples #27, #28, and #30 each have a tension set higher than sample #24, with sample #27 being just slightly higher. As discussed above, this result is expected due to sample #28 omitting the hydrocarbon resin and sample #30 utilizing the polyolefin additive of the highest crystallinity in the test samples. The remaining samples have increased elasticity as evidenced by the lower tension set percentages. Sample #29, which only includes Copolymer D and PR100A (i.e., does not include a polyolefin additive), has the highest elasticity (or lowest tension set) as would be expected.

EXAMPLE 6

The foregoing examples illustrate multiple principles to guide one of skill in the art in implementing the technology of the present disclosure. While specific compositions were discussed in Examples 1-5, it should be understood that such samples were representative only and were not limiting of the scope of the present disclosure or claims. In this Example 6, the enhancements obtained through the blended compositions described herein are studied through modeling efforts to facilitate the balancing of the various properties and to allow one of ordinary skill in the art to better understand the balancing of properties and compositions taught by the present disclosure.

In this Example 6, the blended constituent affect of both the polyolefin additive, Copolymer E, and the hydrocarbon resin, PR100A, in blends with a propylene-based polymer, Copolymer D are modeled to determine which blend component has the greater affect on final elastic film properties. The models and results illustrated in this Example 6 demonstrate exemplary methods for formulating compounds for specific end use applications and performance parameters. To generate the models illustrated in FIGS. 4-8, data regarding blends of the three primary components, Copolymer D, Copolymer E, and PR100A, in varying ratios where used as input into the StatEase™ Design Expert modeling software. StatEase™ Design Expert is one example of commercially available modeling software; other appropriate tools may be used with similar results.

Figure 4:
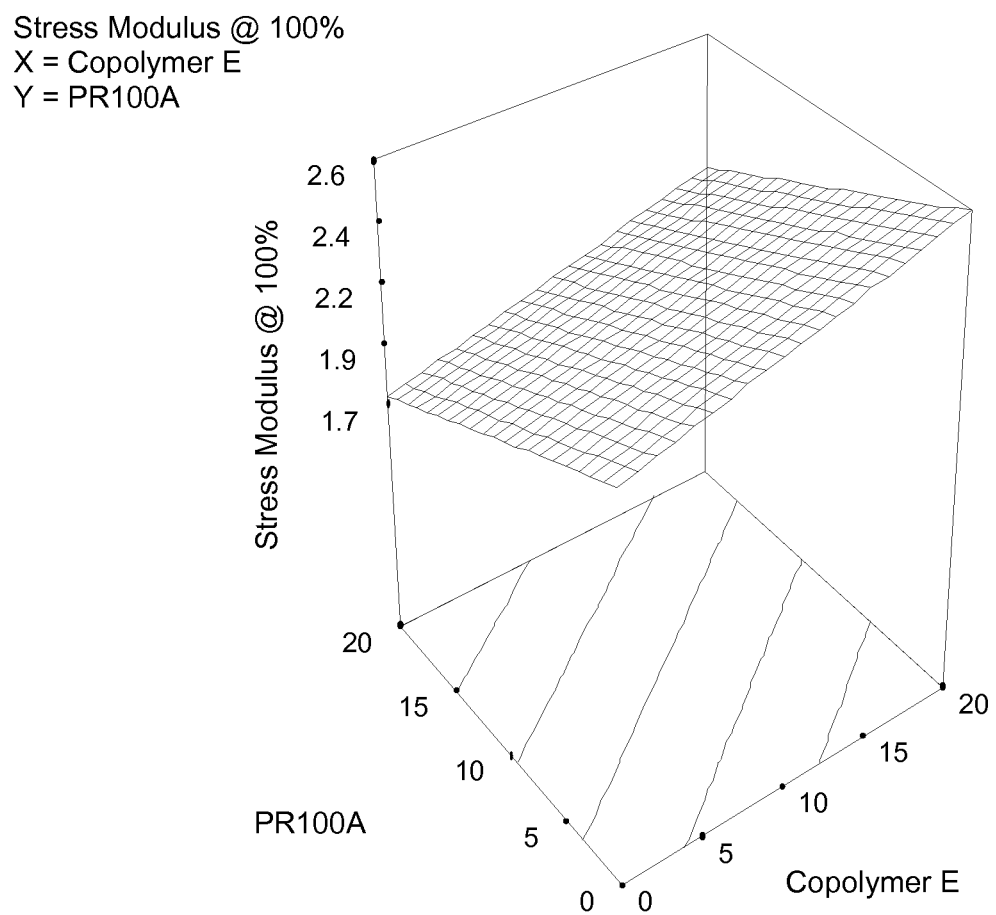
FIG. 4 illustrates a linear model graph of 100% stress modulus as a function of additive concentrations.

FIG. 4 shows a linear model graph for 100% stress modulus. According to the trend illustrated in FIG. 4, Copolymer E level has the greater influence on stress modulus with the stress modulus increasing rapidly with increasing Copolymer E content. PR100A tends to lower the stress modulus with increasing content, but at a rate less rapid than the effect of the Copolymer E. Accordingly, one of ordinary skill in the art will be able to determine the proper balance between hydrocarbon resin and polyolefin additive to obtain a desired stress modulus.

Figure 5:
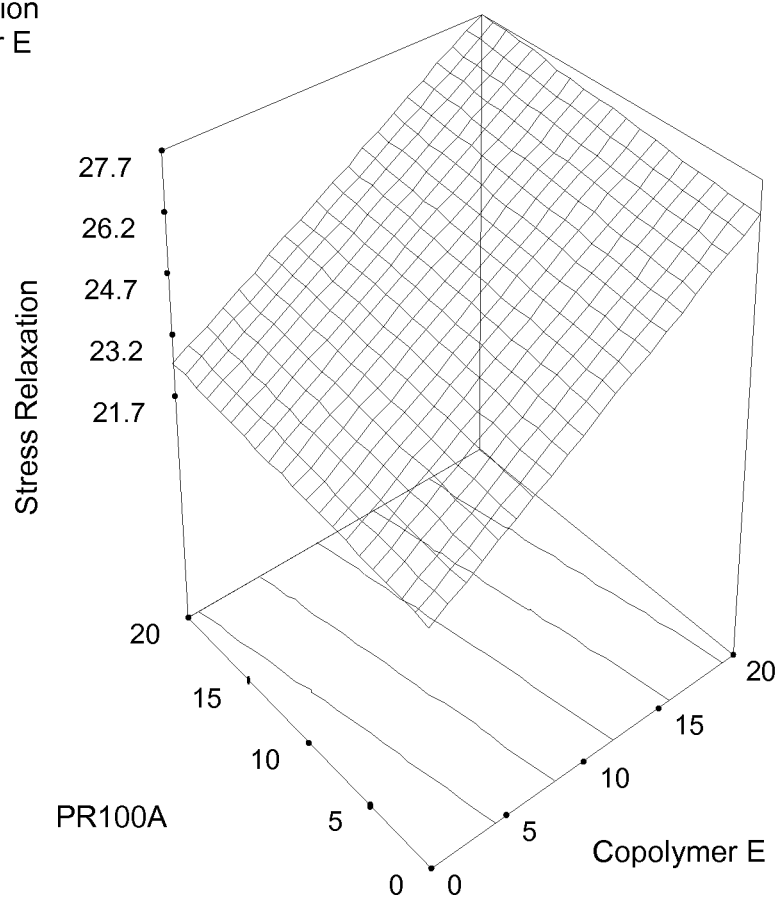
FIG. 5 illustrates a linear model graph of stress relaxation as a function of additive concentrations.

FIG. 5 presents a similar linear model for stress relaxation. Here again, it can be seen that Copolymer E has a greater impact on stress relaxation than PR100A. While stress relaxation is increased by both the hydrocarbon resin and the polyolefin additive, the polyolefin additive effect is more dramatic.

Figure 6:
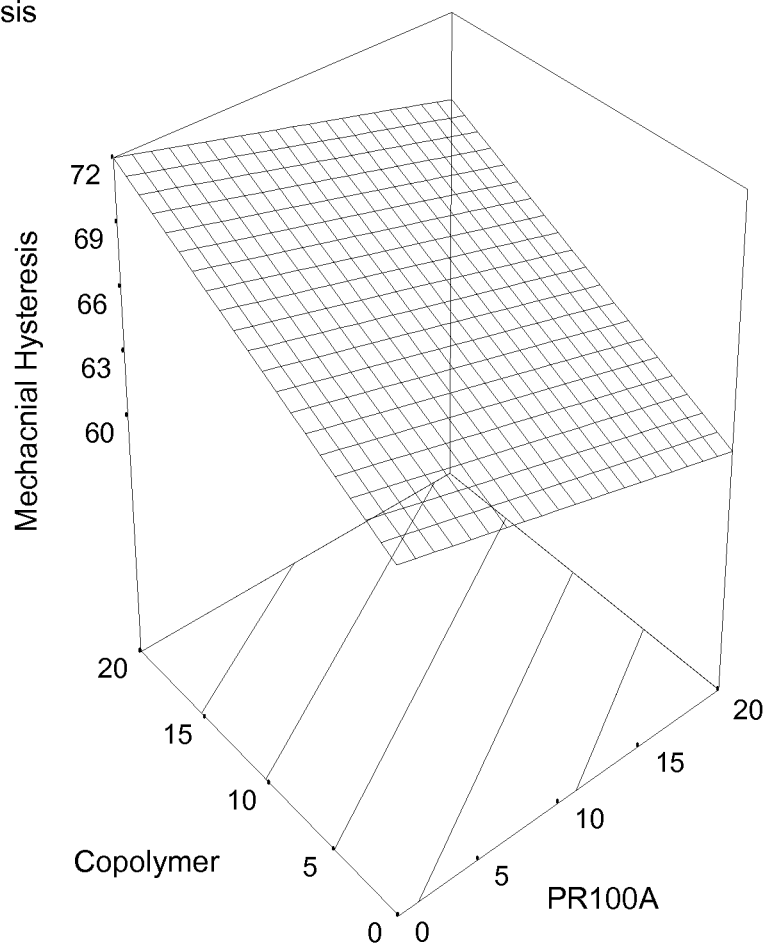
FIG. 6 illustrates a linear model graph of mechanical hysteresis as a function of additive concentrations.
Figure 7:
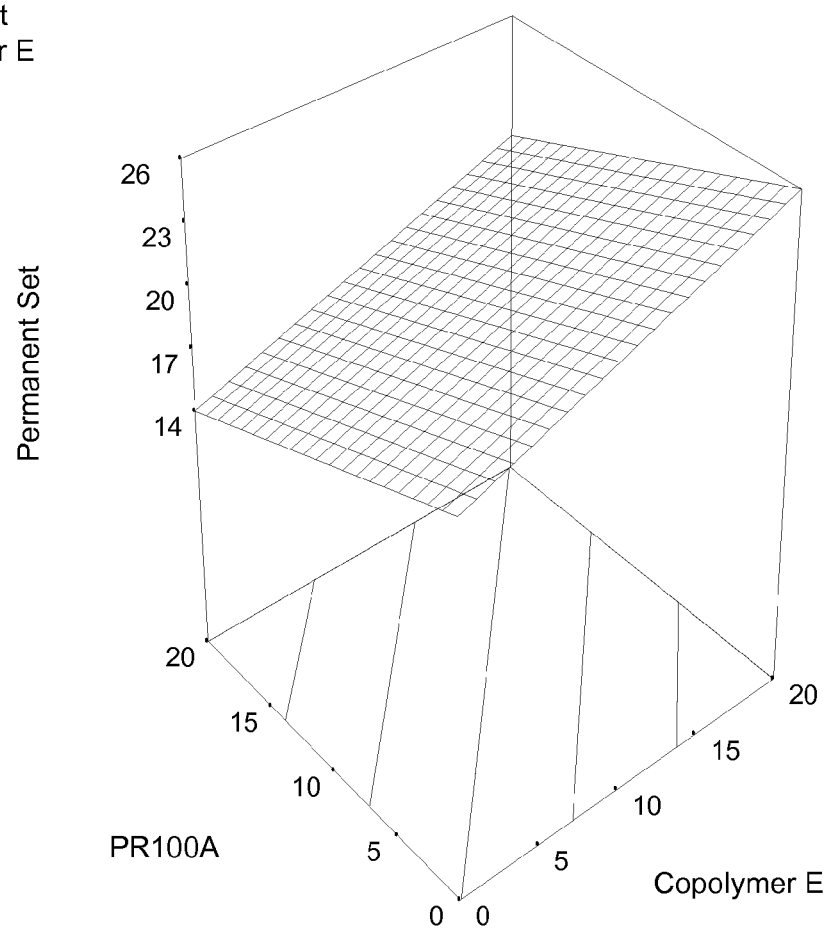
FIG. 7 illustrates a linear model graph of permanent set as a function of additive concentrations.

FIG. 6 presents yet another similar linear model representing hysteresis. It should be noted in FIG. 6 that the X and Y axes are reversed compared to the models shown in FIGS. 4 and 5. According to the model shown in FIG. 6 for hysteresis, Copolymer E again has the greatest affect. As with stress modulus, hysteresis increases with increasing Copolymer E content and decreases with increasing PR100A content. FIG. 7 presents a linear model representing the permanent set. As can be seen, the permanent set model corresponds closely to the model for hysteresis. By balancing the Copolymer E content with the PR100A content, one of ordinary skill will be able to appropriately balance the positive elasticity effects of the hydrocarbon resin and the negative elasticity effects of the polyolefin additive, which is due primarily to the higher crystallinity.

Figure 8:
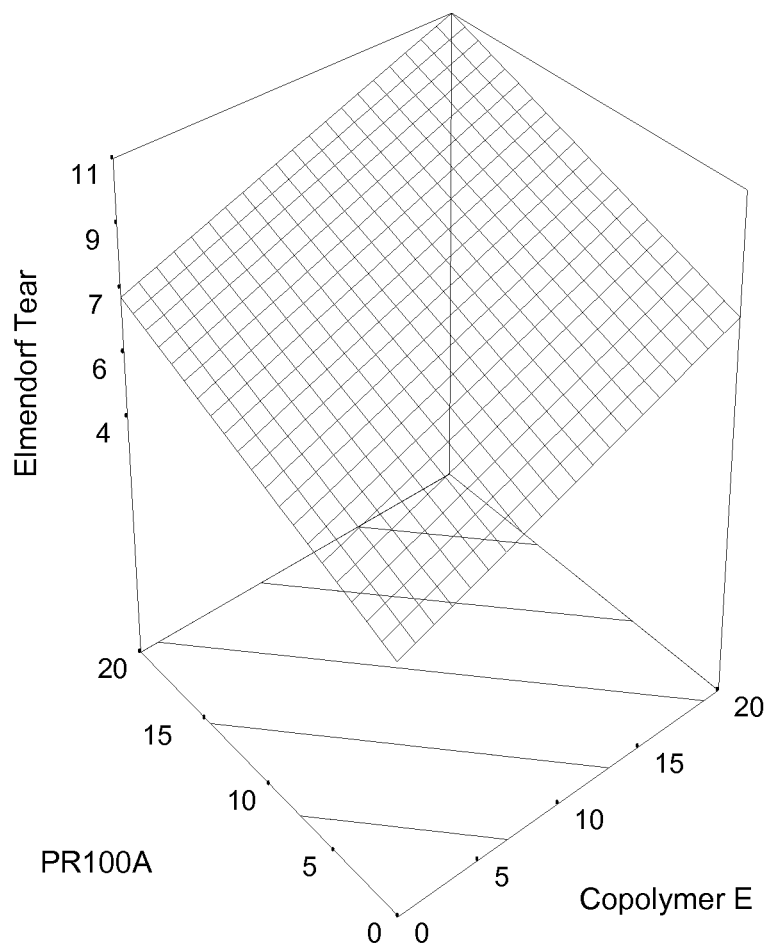
FIG. 8 illustrates a linear model graph of Elmendorf tear strength as a function of additive concentrations.

FIG. 8 depicts a linear model of Elmondorf tear strength for general trend illustrative purposes. From this model it can be seen that both the addition of the hydrocarbon resin, PR100A, and the polyolefin additive, Copolymer E, enhance tear properties, which improve with increasing content of either component. Depending on the end use application of the compound, one of ordinary skill may be able to utilize this combined effect to better balance the elastic properties and the tear properties, or to optimize elasticity and tear strength more easily than elasticity and tensile strength.

Specific embodiments of the invention are further described in the following paragraphs:
1. A film comprising:
   a) at least 80 wt % of a propylene-based polymer having:
      i) 60 wt % or more units derived from propylene, and
      ii) crystallinity of from 0.25% to 40%; resulting from isotactically arranged propylene-derived sequences;
   b) between 0.1 wt % and 20 wt % of a hydrocarbon resin having a glass transition temperature greater than 20° C.; and
   c) between 0.1 wt % and 20 wt % of a polyolefin additive having a crystallinity greater than the crystallinity of the propylene-based polymer;
   wherein the film has
      i) a tension set less than 5% greater than,
      ii) a tensile strength greater than or equal to, and
      iii) a tear strength greater than or equal to
      the same properties of a film formed from the propylene-based polymer alone.
2. The film according to paragraph 1, wherein the weight percent of the hydrocarbon resin and the weight percent of the polyolefin additive is controlled to increase both the film tensile strength and the film tear strength.
3. The film according to paragraphs 1 or 2, wherein the weight percent of the hydrocarbon resin and the weight percent of the polyolefin additive is controlled to increase at least one of the film tensile strength and the film tear strength by at least 10%.
4. The film according to any one of paragraphs 1 to 3, wherein at least one of the film tensile strength and the film tear strength is increased by at least 20%.
5. The film according to any one of paragraphs 1 to 3, wherein the film tear strength is improved by at least 50%.

6. The film of any one of paragraphs 1 to 5, wherein the propylene-based polymer has a heat of fusion less than 45 J/g.

7. The film of any one of paragraphs 1 to 6, wherein the propylene-based polymer has an ethylene content of from 5 wt % to 16 wt %.

8. The film according to any of paragraphs 1 to 7, wherein the one or more propylene-based polymers has an ethylene content of from 12 wt % to 16 wt %.

9. The film according to any of paragraphs 1 to 7, wherein the one or more propylene-based polymers has an ethylene content of from 15 wt % to 16 wt %.

10. The film of any one of paragraphs 1 to 9, wherein the propylene-based polymers has a melt flow rate (230° C./2.16 Kg) of from 1 g/10 min to 400 g/10 min.

11. The film of any one of paragraphs 1 to 9, wherein the propylene-based polymer has a melt flow rate (230° C./2.16 Kg) of at least 20 g/10 min.

12. The film according to any of paragraphs 1 to 9, wherein the one or more propylene-based polymers has a melt flow rate (230° C./2.16 Kg) of about 1 g/10 min to about 30 g/10 min.

13. The film according to any of paragraphs 1 to 9, wherein the propylene-based polymer has a melt flow rate (230° C./2.16 Kg) of at least 3.0 g/10 min.

14. The film according to any of paragraphs 1 to 13, wherein the propylene-based polymer has a density of at least 0.80 g/cm$^3$.

15. The film according to any of paragraphs 1 to 14, wherein the propylene-based polymer has a density of about 0.85 g/cm$^3$ or more.

16. The film according to any of paragraphs 1 to 15, wherein the propylene-based polymer has a density of about 0.86 g/cm$^3$ or more.

17. The film of any one of paragraphs 1 to 16, wherein the propylene-based polymer has a melt temperature of less than 110° C.

18. The film of any one of paragraphs 1 to 17, wherein the hydrocarbon resin is a hydrogenated cycloaliphatic resin.

19. The film of any one of paragraphs 1 to 18, wherein the hydrocarbon resin has a molecular weight (Mn) of from 200 to 5000.

20. The film according to any of paragraphs 1 to 19, wherein the hydrocarbon resin has a molecular weight (Mn) of from 200 to 1000.

21. The film according to any of paragraphs 1 to 20, wherein the hydrocarbon resin has a molecular weight (Mn) of from 500 to 1000.

22. The film of any one of paragraphs 1 to 21, wherein the hydrocarbon resin has a softening point of from 80° C. to 180° C.

23. The film of any one of paragraphs 1 to 22, wherein the hydrocarbon resin has a softening point of from 120° C. to 150° C.

24. The film of any one of paragraphs 1 to 23, wherein the hydrocarbon resin has a softening point of from 125° C. to 140° C.

25. The film of any one of paragraphs 1 to 24, wherein the polyolefin additive comprises at least one of a propylene-based polymer and an ethylene-based polymer.

26. The film of any one of paragraphs 1 to 25, wherein the polyolefin additive comprises a metallocene-catalyzed ethylene-based polymer.

27. The film of any one of paragraphs 1 to 25, wherein the polyolefin additive comprises a second propylene-based polymer.

28. The film of any one of paragraphs 1 to 25, wherein the polyolefin additive comprises polypropylene.

29. The film of any one of paragraphs 1 to 25, wherein the polyolefin additive is LLDPE.

30. The film of any one of paragraphs 1 to 29, wherein the film further has a hysteresis that is less than 5% higher than the hysteresis of the film formed from the propylene-based polymer alone.

31. The film of any one of paragraphs 1 to 30, wherein the selection and weight percent of the polyolefin additive and the hydrocarbon resin is determined based at least in part on one or more of the film tension set, the film hysteresis, the film tensile strength, and the film tear strength.

32. The film of any one of paragraphs 1 to 31, wherein the film is a blown film.

33. A method for making a film, comprising:
    admixing a propylene-based polymer, a miscible hydrocarbon resin, and a polyolefin additive each in an amount sufficient to provide through a standard process a film having a film tension set that is less than 5% higher than a first tension set for a base film prepared through the standard process and without either the hydrocarbon resin or the polyolefin additive, and wherein at least one of a film tensile strength and a film tear strength is improved compared to the first tensile strength and the first tear strength, respectively, of the base film;
    the propylene-based polymer having 60 wt % or more units derived from propylene and isotactically arranged propylene derived sequences; wherein the propylene-based polymer has a crystallinity percentage from 0.25% to 40%; wherein the propylene-based polymer comprises at least about 80 wt % of the film; wherein the hydrocarbon resin has a glass transition temperature greater than 20° C.; wherein the hydrocarbon resin comprises between 0.1 wt % and 20 wt % of the film; wherein the polyolefin additive has a crystallinity percentage greater than the crystallinity percentage of the propylene-based polymer; and wherein polyolefin additive comprises between 0.1 wt % and 20 wt % of the film.

34. The method according to paragraph 33, wherein the propylene-based polymer is present in the film in an amount of from 80 to 90 wt %, the hydrocarbon resin is present in an amount of from 5 to 15 wt %, and the polyolefin-based additive is present in the film in an amount of from 5 to 15 wt % based on the total weight of the film.

35. The method according to paragraph 33, wherein the hydrocarbon resin is a hydrogenated cycloaliphatic resin.

36. The method according to paragraph 33, wherein the polyolefin additive comprises at least one of a propylene-based polymer and an ethylene-based polymer.

37. The method according to any of paragraphs 33 to 36, wherein the intrinsic tear of the film is at least 1.5 gm/micron.

38. The method according to any of paragraphs 33 to 37, wherein the intrinsic tear of the film is at least 2.6 gm/micron.

39. The method according to any of paragraphs 33 to 38, wherein the intrinsic tear of the film is at least 3.9 gm/micron.

40. The method according to any of paragraphs 33 to 39, further comprising one or more styrenic block copolymers.

41. The method according to any of paragraphs 33 to 40, wherein the propylene-based polymer has a melt flow rate (230° C./2.16 Kg) of at least 3.0 g/10 min.

42. The method according to any of paragraphs 33 to 41, wherein the propylene-based polymer has a melt flow rate (230° C./2.16 Kg) of at least 20 g/10 min.

43. The method according to any of paragraphs 33 to 42, wherein the propylene-based polymer has a density of at least 0.80 g/cm$^3$.

44. The method according to any of paragraphs 33 to 43, wherein the propylene-based polymer has a density of about 0.85 g/cm$^3$ or more.

45. The method according to any of paragraphs 33 to 44, wherein the propylene-based polymer has a density of about 0.86 g/cm$^3$ or more.

46. The method according to any of paragraphs 33 to 45, wherein the propylene-based polymer has a melt temperature of less than 110° C.

47. The method according to any of paragraphs 33 to 46, wherein the hydrocarbon resin is a hydrogenated cycloaliphatic resin.

48. The method according to any of paragraphs 33 to 47, wherein the hydrocarbon resin has a molecular weight (Mn) of from 200 to 5000.

49. The method according to any of paragraphs 33 to 48, wherein the hydrocarbon resin has a molecular weight (Mn) of from 200 to 1000.

50. The method according to any of paragraphs 33 to 49, wherein the hydrocarbon resin has a molecular weight (Mn) of from 500 to 1000.

51. The method according to any of paragraphs 33 to 50, wherein the hydrocarbon resin has a softening point of from 80° C. to 180° C.

52. The method according to any of paragraphs 33 to 51, wherein the hydrocarbon resin has a softening point of from 120° C. to 150° C.

53. The method according to any of paragraphs 33 to 52, wherein the hydrocarbon resin has a softening point of from 125° C. to 140° C.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

Although the present invention has been described in considerable detail with reference to certain aspects and embodiments thereof, other aspects and embodiments are possible. Therefore, the spirit and scope of the appended claims should not be limited to the description of the versions contained herein.

What is claimed is:

1. A film comprising:
   a) at least 80 wt % of a propylene-based polymer having:
      i) 60 wt % or more units derived from propylene, and
      ii) crystallinity of from 0.25% to 40%, resulting from isotactically arranged propylene-derived sequences;
   b) between 0.1 wt % and 20 wt % of a hydrocarbon resin having a glass transition temperature greater than 20° C.; and
   c) between 0.1 wt % and 20 wt % of a polyethylene homopolymer or polyethylene which is an ethylene copolymer additive having a crystallinity greater than the crystallinity of the propylene-based polymer and a weight average molecular weight, Mw, of from about 186,000 g/mol to about 290,000 g/mol; wherein
      i) the film has a tension set, after a 100% extension in the transverse direction, less than 5% greater than that of a film formed from the propylene-based polymer alone, and
      ii) at least one of the film tensile strength and the film tear strength is at least 10% greater than that of a film formed from the propylene-based polymer alone.

2. The film according to claim 1, wherein at least one of the film tensile strength and the film tear strength is at least 20% greater than that of a film formed from the propylene-based polymer alone.

3. The film according to claim 1, wherein the film tear strength is at least 50% greater than that of a film formed from the propylene-based polymer alone.

4. The film of claim 1, wherein the propylene-based polymer has a heat of fusion less than 45 J/g.

5. The film of claim 1, wherein the propylene-based polymer has an ethylene content of from 5 wt % to 16 wt %.

6. The film of claim 1, wherein the propylene-based polymer has a melt flow rate (230° C/2.16Kg) of from 1 g/10min to 400 g/10 min.

7. The film of claim 1, wherein the propylene-based polymer has a melt flow rate (230° C/2.16Kg) of at least 20 g/10min.

8. The film of claim 1, wherein the propylene-based polymer has a density of at least 0.80 g/cm$^3$.

9. The film of claim 1, wherein the propylene-based polymer has a melt temperature of less than 110° C.

10. The film of claim 1, wherein the hydrocarbon resin is a hydrogenated cycloaliphatic resin.

11. The film of claim 10, wherein the hydrocarbon resin has a molecular weight (Mn) of from 200 to 5000.

12. The film of claim 10, wherein the hydrocarbon resin has a softening point of from 80° C. to 180° C.

13. The film of claim 1, wherein the polyethylene homopolymer or copolymer additive comprises a metallocene-catalyzed ethylene-based polymer.

14. The film of claim 1, wherein the polyethylene homopolymer or copolymer additive is LLDPE.

15. The film of claim 1, wherein the film further has a hysteresis that is less than 5% higher than the hysteresis of the film formed from the propylene-based polymer alone.

16. A method for making a film, comprising admixing:
   a) at least 80 wt % of a propylene-based polymer having:
      i) 60 wt % or more units derived from propylene, and
      ii) crystallinity of from 0.25% to 40%, resulting from isotactically arranged propylene-derived sequences;
   b) between 0.1 wt % and 20 wt % of a hydrocarbon resin having a glass transition temperature greater than 20° C.; and
   c) between 0.1 wt % and 20 wt % of a polyethylene homopolymer or polyethylene which is an ethylene copolymer additive having a crystallinity greater than the crystallinity of the propylene-based polymer and a weight average molecular weight, Mw, of from about 186,000 g/mol to about 290,000 g/mol;
   wherein
      i) the film has a tension set, after a 100% extension in the transverse direction, less than 5% greater than that of a film formed from the propylene-based polymer alone, and ii) at least one of the film tensile strength and the film tear strength is at least 10% greater than that of a film formed from the propylene-based polymer alone.

17. The method of claim 16, wherein the propylene-based polymer is present in the film at from 80 to 90 wt %, the hydrocarbon resin is present at from 5 to 15 wt %, and the polyethylene homopolymer or copolymer additive is present at from 5 to 15 wt %, based on the total weight of the film.

18. The method of claim 16, wherein the hydrocarbon resin is a hydrogenated cycloaliphatic resin.

* * * * *